US011417873B2

(12) United States Patent
Allie et al.

(10) Patent No.: US 11,417,873 B2
(45) Date of Patent: Aug. 16, 2022

(54) SOLID-STATE BATTERIES, SEPARATORS, ELECTRODES, AND METHODS OF FABRICATION

(71) Applicant: Johnson IP Holding, LLC, Atlanta, GA (US)

(72) Inventors: Lazbourne Alanzo Allie, McDonough, GA (US); Adrian M. Grant, Loganville, GA (US); Devon Lyman, Atlanta, GA (US); Lonnie G. Johnson, Atlanta, GA (US); David Ketema Johnson, Douglasville, GA (US)

(73) Assignee: JOHNSON IP HOLDING, LLC, Atlanta, GA (US)

( * ) Notice: Subject to any disclaimer, the term of this patent is extended or adjusted under 35 U.S.C. 154(b) by 313 days.

(21) Appl. No.: 16/592,562

(22) Filed: Oct. 3, 2019

(65) Prior Publication Data

US 2020/0036000 A1   Jan. 30, 2020

Related U.S. Application Data

(62) Division of application No. 15/387,143, filed on Dec. 21, 2016, now Pat. No. 10,566,611.

(Continued)

(51) Int. Cl.
*H01M 4/36* (2006.01)
*H01M 4/04* (2006.01)
(Continued)

(52) U.S. Cl.
CPC ......... *H01M 4/364* (2013.01); *H01M 4/0471* (2013.01); *H01M 4/13* (2013.01);
(Continued)

(58) Field of Classification Search
CPC ...... H01M 4/364; H01M 4/0471; H01M 4/62; H01M 4/1391; H01M 4/139; H01M 4/131;
(Continued)

(56) References Cited

U.S. PATENT DOCUMENTS 3,237,078 A   2/1966  Mallory
3,393,355 A   7/1968  Whoriskey et al.
(Continued)

FOREIGN PATENT DOCUMENTS

CN   1866583 A    11/2006
CN   101434417 A   5/2009
(Continued)

OTHER PUBLICATIONS

Office Action dated Aug. 9, 2021 in U.S. Appl. No. 12/198,421, by Johnson.

(Continued)

*Primary Examiner* — Gary D Harris
(74) *Attorney, Agent, or Firm* — Panitch Schwarze Belisario & Nadel LLP

(57) ABSTRACT

Solid-state batteries, battery components, and related processes for their production are provided. The battery electrodes or separators contain sintered electrochemically active material, inorganic solid particulate electrolyte having large particle size, and low melting point solid inorganic electrolyte which acts as a binder and/or a sintering aid in the electrode.

19 Claims, 8 Drawing Sheets

Related U.S. Application Data

(60) Provisional application No. 62/398,030, filed on Sep. 22, 2016, provisional application No. 62/315,760, filed on Mar. 31, 2016, provisional application No. 62/270,269, filed on Dec. 21, 2015.

(51) Int. Cl.

| | | |
|---|---|---|
| *H01M 4/131* | (2010.01) | |
| *H01M 4/1391* | (2010.01) | |
| *H01M 4/13* | (2010.01) | |
| *H01M 4/139* | (2010.01) | |
| *H01M 10/052* | (2010.01) | |
| *H01M 4/62* | (2006.01) | |
| *H01M 50/431* | (2021.01) | |
| *H01M 4/505* | (2010.01) | |
| *H01M 4/525* | (2010.01) | |
| *H01M 6/18* | (2006.01) | |
| *H01M 10/0562* | (2010.01) | |

(52) U.S. Cl.
CPC ........... *H01M 4/131* (2013.01); *H01M 4/139* (2013.01); *H01M 4/1391* (2013.01); *H01M 4/505* (2013.01); *H01M 4/525* (2013.01); *H01M 4/62* (2013.01); *H01M 4/624* (2013.01); *H01M 6/185* (2013.01); *H01M 10/052* (2013.01); *H01M 10/0562* (2013.01); *H01M 50/431* (2021.01); *H01M 4/0483* (2013.01); *H01M 2300/0068* (2013.01); *H01M 2300/0071* (2013.01); *H01M 2300/0091* (2013.01)

(58) Field of Classification Search
CPC .... H01M 4/13; H01M 10/052; H01M 2/1646; H01M 10/0562; H01M 4/525; H01M 4/505; H01M 6/185; H01M 4/624; H01M 2300/0071; H01M 2300/0091; H01M 4/0483; H01M 2300/0068
USPC .......................................................... 429/322
See application file for complete search history.

(56) References Cited

U.S. PATENT DOCUMENTS

| | | | |
|---|---|---|---|
| 4,299,682 A | 11/1981 | Oda et al. | |
| 4,303,877 A | 12/1981 | Meinhold | |
| 4,352,068 A | 9/1982 | Weppner | |
| 4,386,020 A | 5/1983 | Hartwig et al. | |
| 4,419,421 A | 12/1983 | Wichelhaus et al. | |
| 4,495,078 A | 1/1985 | Bell et al. | |
| 4,513,069 A | 4/1985 | Kreuer et al. | |
| 4,526,855 A | 7/1985 | Hartwig et al. | |
| 4,614,905 A | 9/1986 | Petersson et al. | |
| 4,654,281 A | 3/1987 | Anderman et al. | |
| 4,704,341 A | 11/1987 | Weppner et al. | |
| 4,710,848 A | 12/1987 | Schlechtriemen et al. | |
| 4,719,401 A | 1/1988 | Altmejd | |
| 4,728,590 A | 3/1988 | Redey | |
| 4,777,119 A | 10/1988 | Brault et al. | |
| 4,792,752 A | 12/1988 | Schlechtriemen et al. | |
| 4,803,134 A | 2/1989 | Sammells | |
| 4,885,267 A | 12/1989 | Takahara et al. | |
| 4,931,214 A | 6/1990 | Worrell et al. | |
| 5,023,153 A | 6/1991 | Weppner | |
| 5,202,788 A | 4/1993 | Weppner | |
| 5,238,761 A | 8/1993 | Ryan | |
| 5,260,821 A | 11/1993 | Chu et al. | |
| 5,270,635 A | 12/1993 | Hoffman et al. | |
| 5,291,116 A | 3/1994 | Feldstein | |
| 5,314,765 A | 5/1994 | Bates | |
| 5,322,601 A | 6/1994 | Liu et al. | |
| 5,336,573 A | 8/1994 | Zuckerbrod et al. | |
| 5,338,625 A | 8/1994 | Bates et al. | |
| 5,362,581 A | 11/1994 | Chang et al. | |
| 5,387,857 A | 2/1995 | Honda et al. | |
| 5,411,592 A | 5/1995 | Ovshinsky et al. | |
| 5,432,026 A | 7/1995 | Sahm et al. | |
| 5,445,906 A | 8/1995 | Hobson et al. | |
| 5,455,126 A | 10/1995 | Bates et al. | |
| 5,474,959 A | 12/1995 | Schafer et al. | |
| 5,512,147 A | 4/1996 | Bates et al. | |
| 5,522,955 A | 6/1996 | Brodd | |
| 5,561,004 A | 10/1996 | Bates et al. | |
| 5,567,210 A | 10/1996 | Bates et al. | |
| 5,569,520 A | 10/1996 | Bates | |
| 5,597,660 A | 1/1997 | Bates et al. | |
| 5,612,152 A | 3/1997 | Bates | |
| 5,654,084 A | 8/1997 | Egert | |
| 5,677,081 A | 10/1997 | Iwamoto et al. | |
| 5,705,293 A | 1/1998 | Hobson | |
| 5,778,515 A | 7/1998 | Menon | |
| 5,783,333 A | 7/1998 | Mayer | |
| 5,783,928 A | 7/1998 | Okamura | |
| 5,811,205 A | 9/1998 | Andrieu et al. | |
| 5,821,733 A | 10/1998 | Turnbull | |
| 6,022,642 A | 2/2000 | Tsukamoto et al. | |
| 6,136,472 A | 10/2000 | Barker et al. | |
| 6,139,986 A | 10/2000 | Kurokawa et al. | |
| 6,168,884 B1 | 1/2001 | Neudecker et al. | |
| 6,182,340 B1 | 2/2001 | Bishop | |
| 6,201,123 B1 | 3/2001 | Daikai et al. | |
| 6,242,129 B1 | 6/2001 | Johnson | |
| 6,255,122 B1 | 7/2001 | Duncombe et al. | |
| 6,387,563 B1 | 5/2002 | Bates | |
| 6,413,285 B1 | 7/2002 | Chu et al. | |
| 6,413,672 B1 | 7/2002 | Suzuki et al. | |
| 6,541,161 B1 | 4/2003 | Scanlon, Jr. | |
| 6,679,926 B1 | 1/2004 | Kajiura et al. | |
| 6,827,921 B1 | 12/2004 | Singhal et al. | |
| 6,852,139 B2 | 2/2005 | Zhang et al. | |
| 6,886,240 B2 | 5/2005 | Zhang et al. | |
| 6,887,612 B2 | 5/2005 | Bitterlich et al. | |
| 7,230,404 B2 | 6/2007 | Kimoto et al. | |
| 7,276,308 B2 | 10/2007 | Formanski et al. | |
| 7,510,800 B2 | 3/2009 | Yoshida et al. | |
| 7,524,580 B1 | 4/2009 | Birke et al. | |
| 7,540,886 B2 | 6/2009 | Zhang et al. | |
| 7,557,055 B2 | 7/2009 | Zhang et al. | |
| 7,674,559 B2 | 3/2010 | Min et al. | |
| 7,691,536 B2 | 4/2010 | Johnson | |
| 7,732,096 B2 | 6/2010 | Thackeray et al. | |
| 7,776,478 B2 | 8/2010 | Klaassen | |
| 7,824,795 B2 | 11/2010 | Yoshida et al. | |
| 7,901,658 B2 | 3/2011 | Weppner et al. | |
| 7,914,932 B2 | 3/2011 | Yoshida et al. | |
| 7,998,622 B2 | 8/2011 | Inda | |
| 8,092,941 B2 | 1/2012 | Weppner et al. | |
| 8,173,292 B2 | 5/2012 | Kato | |
| 8,192,869 B2 | 6/2012 | Teramoto | |
| 8,211,496 B2 | 7/2012 | Johnson et al. | |
| 8,221,916 B2 | 7/2012 | Inda | |
| 8,313,721 B2 | 11/2012 | Thackeray et al. | |
| 8,383,268 B2 | 2/2013 | Inda | |
| 8,431,287 B2 | 4/2013 | Teramoto | |
| 8,476,174 B2 | 7/2013 | Inda | |
| 8,568,921 B1 | 10/2013 | Johnson | |
| 8,778,546 B2 | 7/2014 | Farmer | |
| 8,795,868 B1 | 8/2014 | Miles | |
| 8,808,407 B2 | 8/2014 | Inda | |
| 8,822,077 B2 | 9/2014 | Katoh | |
| 8,852,816 B2 | 10/2014 | Ogasa | |
| 8,883,355 B2 | 11/2014 | Inda | |
| 8,951,681 B2 | 2/2015 | Katoh | |
| 9,034,525 B2 | 5/2015 | Babic et al. | |
| 9,153,838 B2 | 10/2015 | Ogasa | |
| 9,159,989 B2 | 10/2015 | Ogasa | |
| 9,178,255 B2 | 11/2015 | Kumar et al. | |
| 9,203,123 B2 | 12/2015 | Prochazka, Jr. et al. | |
| 9,263,770 B2 | 2/2016 | Boxley et al. | |
| 9,266,780 B2 | 2/2016 | Ogasa | |
| 9,379,375 B2 | 6/2016 | Sugiura et al. | |

(56) References Cited

U.S. PATENT DOCUMENTS

| | | | |
|---|---|---|---|
| 9,385,405 B2 | 7/2016 | Murata et al. | |
| 9,413,033 B2 | 8/2016 | Ogasa | |
| 9,413,036 B2 | 8/2016 | Bhavaraju et al. | |
| 9,425,454 B2 | 8/2016 | Sugiura et al. | |
| 9,450,278 B2 | 9/2016 | Kim et al. | |
| 9,680,191 B2 | 6/2017 | Lee et al. | |
| 9,711,822 B2 | 7/2017 | Nakashima et al. | |
| 9,917,304 B2 | 3/2018 | Lee et al. | |
| 9,954,260 B2 | 4/2018 | Ho | |
| 9,997,813 B2 | 6/2018 | Park et al. | |
| 10,566,611 B2 | 2/2020 | Allie et al. | |
| 10,686,224 B2 | 6/2020 | Angell et al. | |
| 10,693,170 B2 | 6/2020 | Jin et al. | |
| 10,734,686 B2 | 8/2020 | Robins et al. | |
| 10,797,340 B2 | 10/2020 | Lee et al. | |
| 2001/0014505 A1 | 8/2001 | Duncombe et al. | |
| 2001/0036578 A1 | 11/2001 | Nishida et al. | |
| 2002/0000541 A1 | 1/2002 | Sasaki et al. | |
| 2002/0008706 A1 | 4/2002 | Mayes et al. | |
| 2002/0119375 A1 | 8/2002 | Zhang | |
| 2003/0012996 A1 | 1/2003 | Bitterlich et al. | |
| 2003/0030039 A1 | 2/2003 | Sasaki et al. | |
| 2003/0118897 A1 | 6/2003 | Mino et al. | |
| 2003/0157407 A1 | 8/2003 | Kosuzu et al. | |
| 2004/0081888 A1 | 4/2004 | Thackeray et al. | |
| 2004/0101761 A1 | 5/2004 | Park et al. | |
| 2004/0111874 A1 | 6/2004 | Schierle-Arndt et al. | |
| 2004/0118700 A1 | 6/2004 | Schierle-Arndt et al. | |
| 2004/0151986 A1 | 8/2004 | Park et al. | |
| 2004/0191617 A1 | 9/2004 | Visco et al. | |
| 2005/0084758 A1 | 4/2005 | Yamamoto et al. | |
| 2005/0095506 A1 | 5/2005 | Klaassen | |
| 2005/0100793 A1 | 5/2005 | Jonghe et al. | |
| 2005/0147890 A1 | 7/2005 | Shembel et al. | |
| 2005/0266150 A1 | 12/2005 | Yong et al. | |
| 2006/0046149 A1 | 3/2006 | Yong et al. | |
| 2006/0068282 A1 | 3/2006 | Kishi et al. | |
| 2006/0093916 A1 | 5/2006 | Howard et al. | |
| 2006/0165578 A1 | 7/2006 | Sasaki et al. | |
| 2006/0246355 A1 | 11/2006 | Min et al. | |
| 2006/0287188 A1 | 12/2006 | Borland et al. | |
| 2007/0031323 A1 | 2/2007 | Baik et al. | |
| 2007/0048617 A1 | 3/2007 | Inda | |
| 2007/0087269 A1 | 4/2007 | Inda | |
| 2007/0148545 A1 | 6/2007 | Amine et al. | |
| 2007/0148553 A1 | 6/2007 | Weppner | |
| 2007/0231704 A1 | 10/2007 | Inda | |
| 2007/0264579 A1 | 11/2007 | Ota | |
| 2008/0131781 A1 | 6/2008 | Yong et al. | |
| 2008/0220334 A1 | 9/2008 | Inda | |
| 2008/0241698 A1 | 10/2008 | Katoh | |
| 2008/0268346 A1 | 10/2008 | Inda | |
| 2009/0004371 A1 | 1/2009 | Johnson et al. | |
| 2009/0068563 A1 | 3/2009 | Kanda et al. | |
| 2009/0081554 A1 | 3/2009 | Takada et al. | |
| 2009/0081555 A1 | 3/2009 | Teramoto | |
| 2009/0092903 A1 | 4/2009 | Johnson et al. | |
| 2009/0098281 A1 | 4/2009 | Zhang et al. | |
| 2009/0142669 A1 | 6/2009 | Shinohara et al. | |
| 2009/0162755 A1 | 6/2009 | Neudecker | |
| 2009/0194222 A1 | 8/2009 | Teramoto | |
| 2009/0197178 A1 | 8/2009 | Inda | |
| 2009/0197182 A1 | 8/2009 | Katoh | |
| 2009/0214957 A1 | 8/2009 | Okada et al. | |
| 2009/0274832 A1 | 11/2009 | Inda | |
| 2010/0028782 A1 | 2/2010 | Inda | |
| 2010/0047696 A1 | 2/2010 | Yoshida et al. | |
| 2010/0104948 A1 | 4/2010 | Skotheim et al. | |
| 2010/0203383 A1 | 8/2010 | Weppner | |
| 2010/0291443 A1 | 11/2010 | Farmer | |
| 2010/0308278 A1 | 12/2010 | Kepler et al. | |
| 2011/0053001 A1 | 3/2011 | Babic et al. | |
| 2011/0059369 A1 | 3/2011 | Nan et al. | |
| 2011/0076542 A1 | 3/2011 | Farmer | |
| 2011/0086274 A1 | 4/2011 | Chang et al. | |
| 2011/0133136 A1 | 6/2011 | Weppner et al. | |
| 2011/0177397 A1 | 7/2011 | Ogasa | |
| 2011/0209859 A1 | 9/2011 | Reinke et al. | |
| 2011/0223460 A1 | 9/2011 | Farmer | |
| 2011/0223467 A1 | 9/2011 | Shacklette et al. | |
| 2011/0223487 A1 | 9/2011 | Johnson et al. | |
| 2011/0300451 A1 | 12/2011 | Inda | |
| 2011/0318650 A1 | 12/2011 | Zhang et al. | |
| 2012/0100433 A1 | 4/2012 | Suyama et al. | |
| 2012/0141881 A1 | 6/2012 | Geier et al. | |
| 2012/0196189 A1 | 8/2012 | Babic et al. | |
| 2012/0237834 A1 | 9/2012 | Ogasa | |
| 2012/0251882 A1 | 10/2012 | Moon et al. | |
| 2012/0264021 A1 | 10/2012 | Sugiura et al. | |
| 2012/0270115 A1 | 10/2012 | Johnson | |
| 2013/0011751 A1 | 1/2013 | Nakada et al. | |
| 2013/0011752 A1 | 1/2013 | Tanaami et al. | |
| 2013/0017454 A1 | 1/2013 | Sato et al. | |
| 2013/0095394 A1 | 4/2013 | Tanaami et al. | |
| 2013/0157149 A1 | 6/2013 | Peled et al. | |
| 2013/0164616 A1 | 6/2013 | Nakada et al. | |
| 2013/0230777 A1 | 9/2013 | Babic et al. | |
| 2013/0273437 A1 | 10/2013 | Yoshioka et al. | |
| 2013/0309551 A1 | 11/2013 | Ogasa | |
| 2013/0344416 A1 | 12/2013 | Sakamoto et al. | |
| 2014/0008006 A1 | 1/2014 | Lee et al. | |
| 2014/0011080 A1 | 1/2014 | Lee et al. | |
| 2014/0011095 A1 | 1/2014 | Lee et al. | |
| 2014/0023933 A1 | 1/2014 | Chiga et al. | |
| 2014/0038058 A1 | 2/2014 | Holzapfel et al. | |
| 2014/0065456 A1 | 3/2014 | Bhavaraju et al. | |
| 2014/0099538 A1 | 4/2014 | Johnson et al. | |
| 2014/0099556 A1 | 4/2014 | Johnson et al. | |
| 2014/0287305 A1 | 9/2014 | Wachsman et al. | |
| 2015/0037688 A1 | 2/2015 | Otsuka et al. | |
| 2015/0056518 A1 | 2/2015 | Babic et al. | |
| 2015/0056520 A1 | 2/2015 | Thokchom et al. | |
| 2015/0099187 A1* | 4/2015 | Cui | H01M 4/366 |
| | | | 429/231.8 |
| 2015/0099197 A1 | 4/2015 | Nakashima et al. | |
| 2015/0333307 A1 | 11/2015 | Thokchom et al. | |
| 2016/0028133 A1 | 1/2016 | Miles | |
| 2016/0036109 A1 | 2/2016 | Kim et al. | |
| 2016/0149261 A1 | 5/2016 | Zaghib et al. | |
| 2016/0164153 A1 | 6/2016 | Kim et al. | |
| 2016/0181657 A1 | 6/2016 | Kawaji et al. | |
| 2016/0329539 A1 | 11/2016 | Kawaji et al. | |
| 2016/0336583 A1 | 11/2016 | Smith et al. | |
| 2017/0179521 A1 | 6/2017 | Sakamoto et al. | |
| 2017/0214106 A1 | 7/2017 | Johnson et al. | |
| 2017/0222287 A1 | 8/2017 | Suzuki et al. | |
| 2019/0296276 A1 | 9/2019 | Bradwell et al. | |
| 2019/0372148 A1 | 12/2019 | He et al. | |
| 2021/0218091 A1 | 7/2021 | Uddin et al. | |
| 2021/0265616 A1 | 8/2021 | Kim et al. | |

FOREIGN PATENT DOCUMENTS

| | | |
|---|---|---|
| CN | 101494299 A | 7/2009 |
| CN | 102214827 A | 10/2011 |
| CN | 102013536 B | 10/2012 |
| CN | 102934279 A | 2/2013 |
| CN | 104245624 A | 12/2014 |
| CN | 206048735 U | 3/2017 |
| CN | 107437636 A | 12/2017 |
| CN | 206921981 U | 1/2018 |
| CN | 207413450 U | 5/2018 |
| DE | 4309070 A1 | 9/1994 |
| DE | 102004010892 B3 | 11/2005 |
| DE | 102007030604 A1 | 1/2009 |
| DE | 102010019187 A1 | 11/2011 |
| DE | 102015220354 A1 | 4/2017 |
| EP | 0070020 A1 | 1/1983 |
| EP | 0033935 B1 | 8/1985 |
| EP | 0177062 A2 | 4/1986 |
| EP | 0190605 A2 | 8/1986 |
| EP | 0206339 A2 | 12/1986 |
| EP | 0226955 A2 | 7/1987 |
| EP | 0232513 A2 | 8/1987 |

(56) References Cited

FOREIGN PATENT DOCUMENTS

| | | |
|---|---|---|
| EP | 0243975 A2 | 11/1987 |
| EP | 0249802 A2 | 12/1987 |
| EP | 238383 B1 | 8/1989 |
| EP | 0408039 A2 | 1/1991 |
| EP | 0227996 B1 | 7/1991 |
| EP | 0470597 A2 | 2/1992 |
| EP | 0693581 B1 | 5/1998 |
| EP | 1271683 A2 | 1/2003 |
| EP | 1431422 A1 | 6/2004 |
| EP | 1431423 A1 | 6/2004 |
| EP | 1237212 A3 | 4/2005 |
| EP | 2037527 A1 | 3/2009 |
| EP | 2086040 A2 | 8/2009 |
| EP | 2181971 A1 | 5/2010 |
| EP | 2685551 A1 | 1/2014 |
| EP | 2706598 A1 | 3/2014 |
| EP | 2903060 A1 | 8/2015 |
| FR | 2466107 A1 | 3/1981 |
| GB | 1329688 A | 9/1973 |
| GB | 1599792 A | 10/1981 |
| GB | 2226441 B | 12/1992 |
| JP | S628452 A | 1/1987 |
| JP | H05-310417 A | 11/1993 |
| JP | H07235291 A | 9/1995 |
| JP | 2000311710 A | 11/2000 |
| JP | 2000331680 A | 11/2000 |
| JP | 2000331684 A | 11/2000 |
| JP | 2001126757 A | 5/2001 |
| JP | 2001-243954 A | 9/2001 |
| JP | 2003132921 A | 5/2003 |
| JP | 2004127613 A | 4/2004 |
| JP | 2006260887 A | 9/2006 |
| JP | 2006261008 A | 9/2006 |
| JP | 2006310295 A | 11/2006 |
| JP | 2008505458 A | 2/2008 |
| JP | 2009176741 A | 8/2009 |
| JP | 2010067499 A | 3/2010 |
| JP | 2010080426 A | 4/2010 |
| JP | 2010129190 A | 6/2010 |
| JP | 2010132533 A | 6/2010 |
| JP | 2010244729 A | 10/2010 |
| JP | 2011134675 A | 7/2011 |
| JP | 2011150817 A | 8/2011 |
| JP | 2011249254 A | 12/2011 |
| JP | 2012003940 A | 1/2012 |
| JP | 2012099315 A | 5/2012 |
| JP | 2012146479 A | 8/2012 |
| JP | 2013037992 A | 2/2013 |
| JP | 2013157084 A | 8/2013 |
| JP | 2013532359 A | 8/2013 |
| JP | 2015013775 A | 1/2015 |
| JP | 2015138741 A | 7/2015 |
| JP | 2015144061 A | 8/2015 |
| JP | 2015204215 A | 11/2015 |
| JP | 2015534243 A | 11/2015 |
| JP | 2015230801 A | 12/2015 |
| KR | 20140006046 A | 1/2014 |
| RU | 2126192 C1 | 2/1999 |
| WO | 2005085138 A1 | 9/2005 |
| WO | 2006005066 A2 | 1/2006 |
| WO | 2006019245 A1 | 2/2006 |
| WO | 2007004590 A1 | 1/2007 |
| WO | 2007075867 A2 | 7/2007 |
| WO | 2009003695 A2 | 1/2009 |
| WO | 2009029746 A1 | 3/2009 |
| WO | 2011007445 A1 | 1/2011 |
| WO | 2011125481 A1 | 10/2011 |
| WO | 2011150528 A1 | 12/2011 |
| WO | 2011154869 A2 | 12/2011 |
| WO | 2011156392 A1 | 12/2011 |
| WO | 2012008422 A1 | 1/2012 |
| WO | 2012016606 A1 | 2/2012 |
| WO | 2012018831 A1 | 2/2012 |
| WO | 2012128374 A1 | 9/2012 |
| WO | 2012144553 A1 | 10/2012 |
| WO | 2013049460 A1 | 4/2013 |
| WO | 2013085557 A1 | 6/2013 |
| WO | 2013130983 A2 | 9/2013 |
| WO | 2013131005 A2 | 9/2013 |
| WO | 2014058683 A1 | 4/2014 |
| WO | 2014058684 A2 | 4/2014 |
| WO | 2015007680 A1 | 1/2015 |
| WO | 2015104538 A1 | 7/2015 |
| WO | 2015128982 A1 | 9/2015 |
| WO | 2015151144 A1 | 10/2015 |
| WO | 2016102373 A1 | 6/2016 |
| WO | 2016116400 A1 | 7/2016 |
| WO | 2016141765 A1 | 9/2016 |
| WO | 2020225313 A1 | 11/2020 |

OTHER PUBLICATIONS

Wohrle et al., "Sol-Gel Synthesis of the Lithium-Ion Conducting Perovskite La0.57Li0.3TiO3 Effect of Synthesis and Thermal Treatments on the Structure and Conducting Properties," Ionics, vol. 2, pp. 442-445 (1996).
Decision to Grant dated Nov. 24, 2020 in KR Application No. 1020187020835.
Int'l Search Report and Written Opinion dated Mar. 25, 2014 in Int'l Application No. PCT/US2013/063160.
Int'l Search Report and Written Opinion dated Apr. 23, 2014 in Int'l Application No. PCT/US2013/063161.
Int'l Search Report and Written Opinion dated Aug. 15, 2013 in Int'l Application No. PCT/US2013/028672.
Int'l Search Report and Written Opinion dated Aug. 22, 2013 in Int'l Application No. PCT/US2013/028633.
Int'l Search Report dated Feb. 17, 2017 in Int'l Application No. PCT/US2016/068105 (Partial).
Int'l Search Report dated Apr. 12, 2017 in Int'l Application No. PCT/US2016/068105 (Complete).
Jena et al, "Studies on the Ionic Transport and Structural Investigations of La0.5Li0.5TiO3 Perovskite Synthesized by Wet Chemical Methods and the Effect of Ce, Zr Substitution at Ti site," Journal of Materials Science, vol. 40, pp. 4737-4748 (2005).
Jin et al, "Al-doped Li7La3Zr2O12 synthesized by a polymerized complex method," Journal of Power Sources, vol. 196, pp. 8683-8687 (2011).
Jin et al, "All-Solid-State Rechargeable Lithium Ion Battery Fabrication with Al-Doped Li7La3Zr2O12 Solid Electrolyte," Retrieved from <http://international.dep.anl.gov/Postdocs/Symposium/Program/Presentations/32.pdf>, Download date: Oct. 8, 2012, original posting date: unknown, 1 page.
Jin et al, "Bulk solid state rechargeable lithium ion battery fabrication with Al-doped Li7La3Zr2O12 electrolyte and Cu0.1V2O5 cathode," Electrochimica Acta, vol. 89, pp. 407-412 (2013).
Jin, "Processing and characterization of secondary solid-state Li-Ion batteries," Dissertation submitted to the University of Notre Dame (Apr. 2013).
Jinlian et al, "Enhanced high temperature performance of LiMn2O4 coated with Li3BO3 solid electrolyte," Bull. Mater. Sci., vol. 36, No. 4, pp. 687-691 (2013).
Kanamura et al., "Three Dimensionally ordered composite solid materials for all solid-state rechargeable lithium batteries" Journal of Power Sources, 146, pp. 86-89, 2005.
Khatun et al., Impact of Lithium Composition on Structural, Electronic and Optical Properties of Lithium Cobaltite Prepared by Solid-state Reaction Journal of Scientific Research, vol. 6, No. 2, pp. 217-231 (2014).
Kim et al, "Characterization of the Interface Between LiCoO2 and Li7La3Zr2O12 in an All-Solid-State Rechargeable Lithium Battery," Journal of Power Sources, vol. 196, pp. 764-767 (2011).
Kishida et al, "Microstructure of the LiCoO2 (cathode)/La2/3-xLi3xTiO3 (electrolyte) Interface and its Influences on the Electrochemical Properties," Acta Materialia, vol. 55, No. 14, pp. 4713-4722 (2007).
Kitaoka et al, "Preparation of La0.5Li0.5TiO3 Perovskite Thin Films by the Sol-Gel Method," Journal of Materials Science, vol. 32, pp. 2063-2070 (1997).

(56) References Cited

OTHER PUBLICATIONS

Kobayashi et al, "All-Solid-State Lithium Secondary Battery with Ceramic/Polymer Composite Electrolyte," Solid State Ionics, vol. 152-153, pp. 137-142 (2002).
Kokal et al, "Sol-gel Synthesis and Lithium Ion Conductivity of Li7La3Zr2O12 with a Garnet-Related Type Structure," Solid State Ionics, vol. 185, pp. 42-46 (2011).
Kotobuki et al, "Compatibility of Li7La3Zr2O12 Solid Electrolyte to All-Solid-State Battery Using Li Metal Anode," Journal of The Electrochemical Society, vol. 157, No. 10, pp. A1076-A1079 (2010).
Kotobuki et al, "Fabrication of All-Solid-State lithium battery using novel garnet type electrolyte," ECS Meeting Abstracts (2010).
Kotobuki et al, "Fabrication of Three-Dimensional Battery Using Ceramic Electrolyte with Honeycomb Structure by Sol-Gel Process," Journal of The Electrochemical Society, vol. 157, No. 4, pp. A493-A498 (2010).
Kreiter et al, "Sol-gel Routes for Microporous Zirconia and Titania Membranes," J. Sol-Gel Sci. Technol., vol. 48, pp. 203-211 (2008).
Laughlin et al, "Using Sol-Gel Chemistry to Synthesize a Material with Properties Suited for Chemical Sensing," Journal of Chemical Education, vol. 77, No. 1, pp. 77-78 (2000).
Lee et al, "The Production of LiCoO2 Cathode Thick Films for an All-Solid-State Microbattery," Journal of Ceramic Processing Research, vol. 8, No. 2, pp. 106-109 (2007).
Li et al, "Physical and Electrochemical Characterization of Amorphous Lithium Lanthanum Titanate Solid Electrolyte Thin-Film Fabricated by e-beam Evaportation," Thin Solid Films, vol. 515, pp. 1886-1892 (2006).
Li et al., "Synthesis and Characterization of Li ion Conducting La2/3-xLi3xTiO3 by a Polymerizable Complex Method," Ceramics International, vol. 33, pp. 1591-1595 (2007).
Li et al., Physical and electrochemical characterization of amorphous lithium lanthanum titanate solid electrolyte thin-film fabricated by e-beam evaporation Thin Solid Films, 515, pp. 1886-1892, 2006.
Liu et al., "Enhanced high temperature performance of LiMn2O4 coated with Li3BO3 solid electrolyte," Bull. Mater. Sci., vol. 36, No. 4, pp. 687-691 (2013).
Machida et al, "All-Solid-State Lithium Battery with LiCo0.3Ni0.7O2 Fine Powder as Cathode Materials with an Amorphous Sulfide Electrolyte," Journal of The Electrochemical Society, vol. 149, No. 6, pp. A688-A693 (2002).
Maqueda et al, "Structural, Microstructural and Transport Properties Study of Lanthanum Lithium Titanium Perovskite Thin Films Grown by Pulsed Laser Deposition," Thin Solid Films, vol. 516, pp. 1651-1655 (2008).
Mateishina et al, "Solid-State Electrochemical Lithium Cells with Oxide Electrodes and Composite Solid Electrolyte," Russian Journal of Electrochemistry, vol. 43, No. 5, pp. 606-608 (2007).
Meda et al, "Lipon Thin Films Grown by Plasma-Enhanced Metalorganic Chemical Vapor Deposition in a N2—H2—Ar Gas Mixture," Thin Solid Films, vol. 520, pp. 1799-1803 (2012).
Mei et al, "Role of amorphous boundary layer in enhancing ionic conductivity of lithium-lanthanum-titanate electrolyte," Electrochimica Acta, vol. 55, pp. 2958-2963 (2010).
Munshi, "Handbook of Solid State Batteries & Capacitors," World Scientific, Chapters 10-12 (1995).
Murugan et al, "Fast Lithium Ion Conduction in Garnet-Type Li7La3Zr2O12," Angewandte Chemie International Edition, vol. 46, pp. 7778-7781 (2007).
Nagata et al, "All Solid Battery with Phosphate Compounds Made Through Sintering Process," Journal of Power Sources, vol. 174, pp. 832-837 (2007).
Nimisha et al, "Chemical and Microstructural Modifications in LiPON Thin Films Exposed to Atmospheric Humidity," Solid State Ionics, vol. 185, pp. 47-51 (2011).
Office Action dated Jan. 2, 2015 in U.S. Appl. No. 12/198,421 by Johnson.
Office Action dated Jan. 7, 2013 in U.S. Appl. No. 12/198,421 by Johnson.
Office Action dated Jan. 15, 2015 in U.S. Appl. No. 13/829,951 by Johnson.
Office Action dated Jan. 16, 2018 in JP Application No. 2015-535773.
Office Action dated Jan. 17, 2017 in CN Application No. 201380052635.
Office Action dated Jan. 18, 2017 in U.S. Appl. No. 13/829,525, by Johnson.
Office Action dated Jan. 22, 2016 in EP Application No. 13776685.3.
Office Action dated Jan. 24, 2012 in U.S. Appl. No. 12/198,421 by Johnson.
Office Action dated Jan. 25, 2018 in CN Application No. 201380052598.2.
Office Action dated Jan. 31, 2019 in U.S. Appl. No. 15/387,143, by Allie.
Office Action dated Feb. 7, 2018 in U.S. Appl. No. 14/382,194, by Thokchom.
Office Action dated Feb. 10, 2016 in U.S. Appl. No. 13/829,525 by Johnson.
Adachi et al., "Ionic Conducting Lanthanide Oxides," Chem. Rev., vol. 102, pp. 2405-2429 (2002).
Office Action dated Aug. 21, 2020 in U.S. Appl. No. 12/198,421, by Johnson.
Popovici et al, "Sol-gel Preparation and Characterization of Perovskite Lanthanum Lithium Titanate," Journal of Materials Science, vol. 42, pp. 3373-3377 (2007).
Ramzy et al, "Tailor-Made Development of Fast Li Ion Conducting Garnet-Like Solid Electrolytes," Applied Materials & Interfaces, vol. 2, No. 2, pp. 385-390 (2010).
Raskovalov et al, "Structure and transport properties of Li7La3Zr2-0.75xAlxO2 superionic solid electrolytes," Journal of Power Sources (2013).
Rowsell et al, "A new class of materials for lithium-ion batteries: iron(III) borates," Journal of Power Sources, vol. 98-98, pp. 254-257 (2001).
Sakamoto, "Lithium Batteries," Michigan State University (2011).
Sanchez et al, "Chemical Modification of Alkoxide Precursors," Journal of Non-Crystalline Solids, vol. 100, pp. 65-76 (1988).
Scanlon, "Lithium Polymer Battery, Final Report for Dec. 8, 1994-Dec. 30, 2002," Energy Storage and Thermal Sciences Branch, Air Force Research Laboratory (2003).
Shannon et al., "New Li Solid Electrolytes", Electro, vol. 22, No. 7, pp. 783-796 (Jul. 1977).
Song et al, "Review of Gel-Type Polymer Electrolytes for Lithium-ion Batteries," Journal of Power Sources, vol. 77, pp. 183-197 (1999).
Stramare et al, "Lithium Lanthanum Titanates: A Review," Chemistry of Materials, vol. 15, pp. 3974-3990 (2003).
Sulaiman, "Fabrication and Characterization of LiNO3-Al2O3 Composite Solid Electrolytes," 2013 3rd International Conference on Chemistry and Chemical Engineering, vol. 38, pp. 1-5 (2012).
Sun et al, "High-Strength All-Solid Lithium Ion Electrodes Based on Li4Ti5O12," Journal of Power Sources, vol. 196, pp. 6507-6511 (2011).
Tadnaga et al, "Low temperature synthesis of highly ion conductive Li7La3Zr2O12—Li3BO3 composites," Electrochemistry Communications (Apr. 3, 2013).
Tan et al, "Fabrication and Characterization of Li7La3Zr2O12 Thin Films for Lithium Ion Battery," ECS Solid State Letters, vol. 1, No. 6, pp. 057-060 (2012).
Tan et al, "Garnet-type Li7La3Zr2O12 Electrolyte Prepared by a Solution-Based Technique for Lithium ion battery," Mater. Res. Soc. Symp. Proc., vol. 1440 (2012).
Tan et al, "Synthesis of Cubic Phase Li7La3Zr2O12 Electrolyte for Solid-State Lithium-Ion Batteries, Electrochemical and Solid-State Letters," vol. 15, No. 3, pp. A37-A39 (2012).
Tan, "Materials for energy storage in Lithium-Ion batteries," Dissertation submitted to the University of Utah (Dec. 2012).
Thangadurai et al, "Investigations on Electrical Conductivity and Chemical Compatibility Between Fast Llithium Ion Conducting Garnet-Life Li6BaLa2Ta2O12 and Lithium Battery Cathodes," Journal of Power Sources, vol. 142, pp. 339-344 (2005).

(56) References Cited

OTHER PUBLICATIONS

Vijayakumar et al, "Synthesis of Fine Powders of Li3xLa2/3-xTiO3 Perovskite by a Polymerizable Precursor Method," Chemistry of Materials, vol. 16, No. 14, pp. 2719-2724 (2004).
Wang et al., "Ionic/Electronic Conducting Characteristics of LiFePO4 Cathode Materials," Electrochemical and Solid-State Letters, vol. 10, No. 3, pp. A65-A69 (2007).
West, "Basic Solid State Chemistry," John Wiley & Sons Ltd., Ed. 2, pp. vii-xv, 346-351 (1999).
Wolfenstine, "Grain Boundary Conductivity in Crystalline LiTi2(PO4)3," Army Research Laboratory (Apr. 2008).
Written Opinion dated Sep. 22, 2014 in Int'l Application No. PCT/US2013/063161.
Wu et al, "Sol-gel preparation and characterization of Li1.3Al0.3Ti1.7(PO4)3 sintered with flux of LiBO2," Rare Metals, vol. 29, No. 5, p. 515(2010).
Xiong et al, "Effects of Annealing Temperature on Structure and Opt-Electric Properties of Ion-Conducting LLTO Thin Films Prepared by RF Magnetron Sputtering," Journal of Alloys and Compounds, vol. 509, pp. 1910-1914 (2011).
Xu, "Nonaqueous Liquid Electrolytes for Lithium-Based Rechargeable Batteries," Chemical Reviews, vol. 104, pp. 4303-4417 (2004).
Yang et al, "Ionic to Mixed Ionic/Electronic Conduction Transition of Chemically Lithiated Li0.33La0.56TiO3 at Room Temperature: Lithium-ion-Motion Dependent Electron Hopping," Applied Physics Letters, vol. 89, pp. 1-3 (2006).
Yu et al, "A Stable Thin-Film Lithium Electrolyte: Lithium Phosphorus Oxynitride," J. Electrochem. Soc., vol. 144, No. 2, pp. 524-532 (1997).
Zallen, "The Physics of Amorphous Solids," Wiley-VCH, Ed. 1, pp. ix-xi (1983).
Zhang et al, "Effect of lithium borate addition on the physical and electrochemical properties of the lithium ion conductor Li3.4Si0.4P0.6O4," Solid State Ionics, vol. 231, pp. 109-115 (2013).
Zhang et al, "Study on Synthesis and Evolution of Sodium Potassium Niobate Ceramic Powders by an Oxalic Acid-Based Sol-Gel Method," Journal of Sol-Gel Science and Technology, vol. 57, pp. 31-35 (2011).
Office Action dated Sep. 28, 2020 in JP Application No. 2019173287.
Xu et al., "Structures of Orthoborate Anions and Physical Properties of Their Lithium Salt Nonaqueous Solutions," Journal of The Electrochemical Society, vol. 150, No. 1, pp. E74-E80 (2003).
Office Action dated Mar. 17, 2020 in U.S. Appl. No. 16/109,295, by Johnson.
Office Action dated Feb. 21, 2020 in KR Application No. 1020187020835.
Office Action dated Aug. 30, 2021 in JP Application No. 2020114023.
"All-Solid-State Lithium-Ion Battery Using Li2.2C0.8B0.203 Electrolyte" External Program 20th Century International Conferencer, Presented on Poster Board, 2 pgs (Jun. 15, 2015).
"Lithium Batteries," The Sakamoto Group (2011).
Aaltonen et al, "Lithium Lanthanum Titanate Thin Films Grown by Atomic Layer Depostion fo rAll-Solid-State Lithium Ion Battery Applications," Abstract #688, The 15th International Meeting on Lithium Batteries (2010).
Ahn et al, "Characteristics of Amorphous Lithium Lanthanum Titanate Electrolyte Thin Films Grown by PLD for Use in Rechargeable Lithium Microbatteries," Electrochemical and Solid-State Letters, vol. 8, No. 2, pp. A75-A78 (2005).
Ahn et al, "Characteristics of Perovskite (Li0.5La0.5)TiO3 Solid Electrolyte Thin Films Grown by Pulsed Laser Deposition for Rechargeable Lithium Microbattery," Electrochimica Acta, vol. 50, pp. 371-374 (2004).
Ahn et al, "Effect of Li0.5La0.5TiO3 Solid Electrolyte Films on Electrochemical Properties of LiCoO2 Thin Film Cathodes with Different Rapid-Thermal Annealing Conditions," Journal of Vacuum Science & Technology B, vol. 23, No. 5, pp. 2089-2094 (2005).
Allen et al, "Effect of substitution (Ta, Al, Ga) on the conductivity of Li7La3Zr2O12," Journal of Power Sources, vol. 206, pp. 315-319 (2012).
Allnatt et al, "Atomic Transport in Solids," Cambridge University Press, pp. ix-xiii (2003).
Aruna et al, "Combustion Synthesis and Nanomaterials," Current Opinion in Solid State and Materials Science, vol. 12, pp. 44-50 (2008).
Awaka et al, "Synthesis and Structure Analysis of Tetragonal Li7La3Zr2O12 with the Garnet-Related Type Structure," Journal of Solid State Chemistry, vol. 182, No. 8, pp. 2046-2052 (2009).
Babic, "A Novel Li Conducting Solid State Electrolyte by Sol Gel Technique" (undated).
Balkanski et al, "Inegrable lithium solid-state microbatteries," Journal of Power Sources, vol. 26, pp. 615-622 (1989).
Bates et al., "Rechargeable Thin-Film Lithium Batteries," Oak Ridge National Laboratory Publication, 9 pgs (1993).
Billinge, "The Nanostructure Problem," Physics, vol. 3, No. 25, pp. 1-3 (2010).
Birke et al, "A first approach to a monolithic all solid state inorganic lithium battery," Solid State Ionics, vol. 118, pp. 149-157 (1999).
Birke et al, "Electrolytic Stability Limit and Rapid Lithium Insertion in the Fast-Ion-Conducting Li0.29La0.57TiO3 Perovskite-Type Compound," Journal of the Electrochemical Society, vol. 144, No. 6, pp. L167-L169 (1997).
Bohnke et al, "Mechanism of Ionic Conduction and Electrochemical Intercalation of Lithium into the Perovskite Lanthanum Lithium Titanate," Solid State Ionics, vol. 91, pp. 21-31 (1996).
Boyd, "Thin Film Growth by Pulsed Laser Deposition," Ceramics International, vol. 22, pp. 429-434 (1996).
Boyle et al, "All-Ceramic Thin Film Battery," Sandia Report 2002-3615 Unlimited Release, 53 pgs (Nov. 2002).
Brenier, "Stress and Moisture-Sorption in Ozone-Annealed Films of Zirconium Oxide Obtained from Sol-Gel," Journal of Sol-Gel Science and Technology, vol. 25, pp. 57-63 (2002).
Brinker et al, "Sol-Gel Science: The Physics and Chemistry of Sol-Gel Processing," Academic Press, pp. 21, 95, 453, 513, 675, 742, 787, and 837 (1990).
Buschmann et al, "Structure and dynamics of the fast lithium ion conductor Li7La3Zr2O12," Physical Chemistry Chemical Physics, vol. 43 (2011).
Cao et al, "Microstructure and Ionic Conductivit of Sb-doped Li7La3Zr2O12," Journal of Inorganic Materials,vol. 29, No. 2, pp. 220-224 (2014).
Chabal et al, "Safer High-performance Electrodes, Solid Electrolytes, and Interface Reactions for Lithium-Ion Batteries," Material Matters, vol. 8, No. 4, pp. 104-110 (2013).
Chen et al, "Improving ionic conductivity of Li0.35La0.55TiO3 ceramics by introducing Li7La3Zr2O12 sol into the precursor powder," Solid State Ionics, vol. 235, pp. 8-13 (2013).
Chen et al., High Capacity and Cyclic Performance in a Three-Dimensional Composite Electrode Filled with Inorganic Solid Electrolyte. Journal of Power Sources, vol. 249, pp. 306-310 (2014).
Chi-Lin Li et al, "Physical and electrochemical characterization of amorphous lithium lanthanum titanate solid electrolyte thin-film fabricated by e-beam evaporation," Thin Solid Films, vol. 515, pp. 1886-1892 (2006).
Cussen, "Structure and Ionic Conductivity in Lithium Garnets," Journal of Materials Chemistry, vol. 20, pp. 5167-5173 (2010).
Davison et al, "Low Cost, Novel Methods for Fabricating All-Solid-State Lithium Ion Batteries," downloaded from web page: <http://www.wpi.edu/Pubs/E-project/Available/E-project-042312-141301/unrestricted/SS_Lithium_Ion_Battery_MQP_Final_Report.pdf>, Download date: Apr. 23, 2012, original posting date unknown, 126 pages.
Drabold, "Topics in the Theory of Amorphous Materials," The European Physical Journal B, vol. 68, pp. 1-21 (2009).
Elliott, "Physics of Amorphous Materials," Longman Scientific & Technical, Ed. 2, pp. v-vi (1990).
Examination Report dated Jun. 22, 2016 in EP Application No. 13776685.3.
Examination Report dated Nov. 30, 2016 in EP Application No. 13776685.3.
Extended European Search Report dated Feb. 8, 2017 in EP Application 16202541.

(56) References Cited

OTHER PUBLICATIONS

Extended European Search Report dated Mar. 16, 2017 in EP Application No. 17150717.
Furusawa et al, "Ionic Conductivity of Amorphous Lithium Lanthanum Titanate Thin Film," Solid State Ionics, vol. 176, pp. 553-558 (2005).
Gao et al, "Sol-gel Synthesis and Electrical Properties of Li5La3Ta2O12 Lithium Ionic Conductors," Solid State Ionics, vol. 181, Nos. 1-2, pp. 33-36 (2009).
Geiger et al, "Crystal Chemistry and Stability of 'Li7La3Zr2O12' Garnet: A Fast Lithium-Ion Conductor," Inorganic Chemistry, vol. 50, pp. 1089-1097 (2011).
Glass et al, "Ionic Conductivity of Quenched Alkali Niobate and Tantalate Glasses," Journal of Applied Physics, vol. 49, No. 9, pp. 4808-4811 (1978).
Goodenough et al, "Challenges for Rechargeable Li Batteries," Chemistry of Materials, vol. 22, No. 3, pp. 587-603 (2010).
Huggins, "Advanced Batteries: Materials Science Aspects," Springer, Ed. 1, pp. xvii-xxx, 368-371 (2008).
Hämäläinen et al, "Lithium Phosphate Thin Films Grown by Atomic Layer Deposition," Journal of The Electrochemical Society, vol. 159, No. 3, pp. A259-A263 (2012).
Inaguma et al., "High Ionic Conductivity in Lithium Lanthanum Titanate," Solid State Communications, vol. 86, No. 10, pp. 689-693 (1993).
Int'l Preliminary Examination Report on Patentability dated Jul. 5, 2018 in Int'l Application No. PCT/US2016/068105.
Int'l Preliminary Report on Patentabililty dated Apr. 23, 2015 in Int'l Application No. PCT/US2013/063160.
Int'l Preliminary Report on Patentability dated Feb. 14, 2013 in Int'l Application No. PCT/US2011/046289.
Int'l Preliminary Report on Patentability dated Sep. 2, 2014 in Int'l Application No. PCT/US2013/028672.
Int'l Preliminary Report on Patentability dated Sep. 12, 2014 in Int'l Application No. PCT/US2013/028633.
Int'l Preliminary Report on Patentability dated Dec. 22, 2014 in Int'l Application No. PCT/US2013/063161.
Int'l Search Report and Written Opinion dated Jan. 6, 2012 in Int'l Application No. PCT/US2011/046289.
Office Action dated Sep. 10, 2021 in CN Application No. 201910697285.1 (with English Translation of Search Report).
Office Action dated Feb. 15, 2017 in CN Application No. 201380052598.2.
Office Action dated Feb. 20, 2017 in JP Application No. 2014-560097.
Office Action dated Mar. 2, 2016 in CN Application No. 201380023413.5.
Office Action dated Mar. 14, 2018 in U.S. Appl. No. 13/829,525, by Johnson.
Office Action dated Mar. 30, 2018 in CN Application No. 201380023413.5.
Office Action dated Apr. 9, 2015 in U.S. Appl. No. 13/829,525 by Johnson.
Office Action dated Apr. 10, 2018 EP Application No. 16202541.5.
Office Action dated Apr. 29, 2014 in U.S. Appl. No. 12/848,991 by Babic.
Office Action dated May 1, 2014 in U.S. Appl. No. 13/410,895, by Babic.
Office Action dated May 4, 2015 in U.S. Appl. No. 13/829,951 by Johnson.
Office Action dated May 4, 2016 in KR Application No. 10-2014-7027734.
Office Action dated May 19, 2017 in U.S. Appl. No. 12/198,421, by Johnson.
Office Action dated May 30, 2017 in JP Application No. 2015-535772.
Office Action dated Jun. 2, 2016 in CN Application No. 201380052598.2.
Office Action dated Jun. 5, 2019 in CN Application No. 201380052598.2.
Office Action dated Jun. 12, 2017 in U.S. Appl. No. 14/382,194, by Thokchom.
Office Action dated Jun. 13, 2017 in JP Application No. 2015-535773.
Office Action dated Jun. 15, 2017 in U.S. Appl. No. 14/382,191, by Thokchom.
Office Action dated Jun. 17, 2019 in U.S. Appl. No. 15/387,143, by Allie.
Office Action dated Jun. 19, 2014 in U.S. Appl. No. 13/829,951, by Johnson.
Office Action dated Jun. 24, 2019 in JP Application No. 2018551909.
Office Action dated Jun. 26, 2015 in U.S. Appl. No. 14/530,171 by Babic.
Office Action dated Jul. 1, 2015 in U.S. Appl. No. 13/829,525 by Johnson.
Office Action dated Jul. 5, 2016 in CN Application No. 201380052635.X.
Office Action dated Jul. 13, 2011 in U.S. Appl. No. 12/163,044 by Johnson.
Office Action dated Jul. 15, 2016 in KR Application No. 10-2014-7027734.
Office Action dated Jul. 20, 2017 in CN Application No. 201380052635.X.
Office Action dated Jul. 21, 2016 in U.S. Appl. No. 13/829,951, by Johnson.
Office Action dated Jul. 27, 2016 in U.S. Appl. No. 13/829,525, by Johnson.
Office Action dated Aug. 7, 2017 in U.S. Appl. No. 13/829,525, by Johnson.
Office Action dated Aug. 7, 2019 in U.S. Appl. No. 12/198,421, by Johnson.
Office Action dated Aug. 11, 2017 in CN Application No. 2013800234135.
Office Action dated Aug. 22, 2016 in JP Application No. 2014-560097.
Office Action dated Aug. 31, 2015 in KR Application No. 10-2014-7027734.
Office Action dated Sep. 3, 2018 in CN Application No. 201380052598.2.
Office Action dated Sep. 4, 2015 in EP Application No. 13776685.3.
Office Action dated Sep. 7, 2015 in JP Application No. 2014-560097, translation only.
Office Action dated Sep. 8, 2015 in U.S. Appl. No. 12/198,421 by Johnson.
Office Action dated Sep. 14, 2016 in U.S. Appl. No. 12/198,421, by Johnson.
Office Action dated Nov. 18, 2016 in CN Application No. 201380023413.5.
Office Action dated Nov. 18, 2016 in U.S. Appl. No. 13/829,951, by Johnson.
Office Action dated Dec. 6, 2013 in U.S. Appl. No. 12/848,991 by Babic.
Office Action dated Dec. 13, 2018 in CN Application No. 2013800234135.
Office Action dated Jun. 29, 2018 in U.S. Appl. No. 14/382,194, by Thokchom.
Oh et al, "Ionomer Binders Can Improve Discharge Rate Capability in Lithium-Ion Battery Cathodes," Journal of The Electrochemical Society, vol. 158, No. 2, pp A207-A213 (2011).
Ohta et al, "All-solid-state lithium ion battery using garnet-type oxide and Li3BO3 solid electrolytes fabricated by screen-printing," Journal of Power Sources (2013).
Okumura et al., "All-Solid-State Lithium-Ion Battery Using Li2.2C0.8B0.8B0.2O3 Electrolyte", Solid State Ionic, vol. 288, pp. 248-252 (2016).
Owen, "Rechargeable Lithium Batteries," Chemical Society Reviews, vol. 26, pp. 259-267 (1997).
Peters et al, "Ionic Conductivity and Activation Energy for Oxygen Ion Transport in Superlattices—The Multilayer System CSZ (ZrO2 + CaO) / Al2O3," Solid State Ionics, vol. 178, Nos. 1-2, pp. 67-76 (2007).

(56) References Cited

OTHER PUBLICATIONS

Pham et al, "Synthesis and Characterization of Nanostructured Fast Ionic Conductor Li0.30La0.56TiO3," Chemistry of Materials, vol. 18, No. 18, pp. 4385-4392 (2006).
Office Action dated Mar. 26, 2021 in CN Application No. 201680075318.3.
Office Action dated Aug. 3, 2020 in CN Application No. 201680075318.3.
Office Action dated Nov. 16, 2021 in CN Application No. 201680075318.3.
Extended European Search Report dated Dec. 16, 2021 in EP Application No. 21186896.3.
Office Action dated Feb. 9, 2022 in EP Application No. 16823507.5.
Abraham et al., "A Polymer Electrolyte-Based Rechargeable Lithium/Oxygen Battery," Journal of The Electrochemical Society, vol. 143, No. 1, pp. 1-5 (1996).
Annamareddy et al., "Ion Hopping and Constrained Li Diffusion Pathways in the Superionic State of Antifluorite Li2O," Entropy, vol. 19, No. 227, pp. 1-11 (2017).
Briant et al., "Ionic Conductivity in Lithium and Lithium-Sodium Beta Alumina," Journal of The Electrochemical Society, vol. 128, No. 9, pp. 1830-1834 (1981).
Datta et al., "Silicon and Carbon Based Composite Anodes for Lithium Ion Batteries," Journal of Power Sources, vol. 158, pp. 557-563 (2006).
Extended European Search Report dated Feb. 12, 2020 in EP Application No. 19192837.3.
Giordani et al., "A Molten Salt Lithium-Oxygen Battery," Journal of the American Chemical Society, 26 pages (2016).
International Preliminary Report on Patentability dated Aug. 2, 2018 in International Application No. PCT/US2017/014035.
Int'l Search Report and Written Opinion dated Mar. 16, 2017 in Int'l Application No. PCT/US2017/014035.
Int'l Search Report and Written Opinion dated Aug. 25, 2020 in Int'l Application No. PCT/US2020/026334.
Kim et al., "A review of lithium and non-lithium based solid state batteries," Journal of Power Sources, vol. 282, pp. 299-322 (2015).
Kotobuki et al., "Fabrication of All-Solid-State Lithium Battery with Lithium Metal Anode Using Al2O3-Added Li7 La3 Zr2 O12 Solid Electrolyte," Journal of Power Sources, vol. 196, pp. 7750-7754 (2011).
Li et al., "Developments of electrolyte systems for lithium-sulfur batteries: a review," Frontiers in Energy Research, vol. 3, No. 5, pp. 1-12 (2015).
Limthongkul et al., "Electrochemically-Driven Solid State Amorphization in Lithium-Silicon Alloys and Implications for Lithium Storage," Acta Materialia, vol. 51, pp. 1103-1113 (2003).
Ma, Ying, "Ceria-based Nanostructured Materials for Low-Temperature Solid Oxide Fuel Cells," School of Information and Communication Technology, Functional Materials Division, Royal Institute of Technology, 52 pages (2012).
Masset et al., "Thermal activated (thermal) battery technology Part II. Molten salt electrolytes," Journal of Power Sources, vol. 164, pp. 397-414 (2007).
Miles et al., "Cation Effects on the Electrode Reduction of Molten Nitrates," Journal of The Electrochemical Society, vol. 127, pp. 1761-1765 (1980).
Miles, Melvin H., "Lithium Batteries Using Molten Nitrate Electrolytes," Battery Conference on Applications and Advances. The Fourteenth Annual, pp. 39-42 (1999).
Obrovac et al., "Reversible Cycling of Crystalline Silicon Powder," Journal of The Electrochemical Society, vol. 154, No. 2, pp. A103-A108 (2007).
Office Action and Search Report dated Jan. 20, 2021 in TW Application No. 109111527 (with Brief Summary of Relevant Portions of Office Action).
Office Action dated Jun. 7, 2018 in U.S. Appl. No. 15/408,991, by Johnson.
Office Action dated Jun. 10, 2019 in JP Application No. 2018538203 (Partial English Translation).
Office Action dated Nov. 2, 2018 in U.S. Appl. No. 12/198,421, by Johnson.
Office Action dated Dec. 17, 2020 in CN Application No. 201780007783.8.
Read et al., "Characterization of the Lithium/Oxygen Organic Electrolyte Battery," Journal of The Electrochemical Society, vol. 149, No. 9, pp. A1190-A1195 (2002).
Singhal et al., "High Temperature Solid Oxide Fuel Cells: Fundamentals, Design and Applications," Elsevier Advanced Technology, 430 pages (2003).
Wang et al., "Ionic Conductivities and Structure of Lithium Phosporus Oxynitride Glasses," Journal of Non-Crystalline Solids, vol. 183, pp. 297-306 (1995).
International Search Report dated May 3, 2022 in International Application No. PCT/US2022/011012.
Office Action dated May 16, 2022 in U.S. Appl. No. 16/838,706, by Johnson.

* cited by examiner

SOLID-STATE BATTERIES, SEPARATORS, ELECTRODES, AND METHODS OF FABRICATION

CROSS-REFERENCE TO RELATED APPLICATIONS

This application claims priority to co-pending U.S. patent application Ser. No. 15/387,143, filed Dec. 21, 2016, which claims priority to U.S. Provisional Application No. 62/270,269, filed Dec. 21, 2015, U.S. Provisional Patent Application No. 62/315,760, filed Mar. 31, 2016, and U.S. Provisional Patent Application No. 62/398,030, filed Sep. 22, 2016, the disclosures of which are herein incorporated by reference in their entirety.

BACKGROUND OF THE INVENTION

Solid-state lithium batteries were developed by Duracell in the 1970s and made commercially available in the 1980s, but are no longer produced. These cells included a lithium metal anode, a dispersed phase electrolyte of lithium iodide and $Al_2O_3$, and a metal salt as the cathode. The Li/LiI ($Al_2O_3$)/metal salt construction was a true solid-state battery, but these batteries were not rechargeable.

Because of the passivation reactions and unstable interfaces that form between organic electrolyte materials such as liquid and solid polymer electrolytes, it has long been a goal to develop a rechargeable solid state lithium based battery using an inorganic solid electrolyte material. In the early 1990s, a second type of all-solid-state battery was developed at the Oak Ridge National Laboratories. These cells consisted of thin films of cathode, inorganic electrolyte, and anode materials deposited on a ceramic substrate using vacuum deposition techniques, including RF sputtering for the cathode and electrolyte and vacuum evaporation of the Li metal anode. The total thicknesses of the cells were typically less than 10 µm: the cathode had a thickness of less than 4 µm, the solid electrolyte a thickness of around 2 µm (just sufficient to provide electrical isolation of the cathode and anode) and the Li anode a thickness of around 2 µm. Since strong chemical bonding (both within each layer and between the layers of the cell) was provided by the physical vapor deposition technique, the transport properties of these cells were excellent. Although the solid electrolyte LiPON has a conductivity of only $2 \times 10^{-6}$ S/cm$^{-1}$ (fifty times lower than that of the LiI($Al_2O_3$) solid electrolyte used in the earlier Duracell battery), the impedance of the thin 2 um layer was very small, allowing for very high rate capability. However, batteries based on this technology are very expensive to fabricate, are very small, and have very low capacity.

Solid-state batteries are the focus of a great deal of attention because of the potential for attractive performance properties, including long shelf life, long term stable power capability, no gassing, broad operating temperature range (−40° C. to 170° C. for pure lithium anodes and up to and beyond 300° C. using active composite anodes), and high volumetric energy density (up to 2000 Wh/L). They are particularly suited for applications requiring long life under low-drain or open-circuit conditions.

Currently, Li-ion battery chemistry using liquid electrolyte provides the best known performance and is becoming the most widely used of all battery chemistries. Lithium ion cells consist of thick (~100 µm) porous composite cathodes cast on a thin (~10 µm) Al foil current collector. The composite cathode typically contains both $LiCoO_2$ as the active material, due to its high capacity and good cycle life, and carbon black, which provides electrical conductivity throughout the layer. A number of active cathode materials have been and are being investigated in an effort to improve battery performance. Some of these materials have been implemented in cells, including Lithium Nickel Cobalt Manganese Oxide. A thin polymer separator provides electrical isolation between the cathode and the carbon-based anode. The anode intercalates Li during the charge cycle. The cell is immersed in a liquid electrolyte, which provides very high conductivity for the transport of Li ions between the cathode and anode during charge and discharge. Because the separator and composite cathode and anode are all porous, the liquid electrolyte is absorbed into and fills the structure, thus providing excellent surface contact with the $LiCoO_2$ active material and allowing fast transport of Li ions throughout the cell with minimal impedance.

The liquid electrolyte itself consists of a Li salt (for example, $LiPF_6$) in a solvent blend which typically includes ethylene carbonate and other linear carbonates, such as dimethyl carbonate. Despite improvements in energy density and cycle life, there remain several underlying problems with batteries that contain liquid electrolytes. For example, liquid electrolytes are generally volatile and subject to pressure build up, explosion, and fire under a high charge rate, a high discharge rate, and/or internal short circuit conditions. Additionally, charging at a high rate can cause dendritic lithium growth on the surface of the anode. The resulting dendrites can extend through the separator and internally short circuit in the cell. Further, the self-discharge and efficiency of the cell is limited by side reactions and corrosion of the cathode by the liquid electrolyte. Still further, the liquid electrolyte also creates a hazard if the cell over-heats due to overvoltage or short circuit conditions, creating another potential fire or explosion hazard.

To address safety and reliability problems with lithium based batteries that employ liquid electrolytes, and to achieve high energy density, solid-state batteries that employ high capacity lithium intercalation compounds are being developed. Past attempts at constructing such all-solid-state batteries have been limited by the need to bind the materials together in order to facilitate effective lithium ion transport across interfaces. This binding process has been attempted by sintering at high temperature, such as 800° C. and higher. However, the cathode and electrolyte materials may react with each other at such sintering temperatures, resulting in high impedance interfaces and an ineffective battery.

To avoid the parasitic reaction problems associated with high temperature sintering, all solid state batteries have been developed using a low temperature sol gel process. These all-solid-state batteries consist of a composite cathode containing active battery cathode material (e.g., $LiNiMnCoO_2$, $LiCoO_2$, $LiMn_2O_4$, $Li_4Ti_5O_{12}$ or similar), an electrically conductive material (e.g., carbon black), and lithium ion conductive glass electrolyte material, such as $Li_{3x}La_{2/3-x}TiO_3$ (x=0.11) (LLTO) or $Li_7La_3Zr_2O_{12}$ (LLZO) that may be formed in situ from a liquid, organic precursor. When gelled and subsequently cured at low temperature, the precursor is transformed into a solid lithium ion conductive glass electrolyte.

In constructing a solid-state battery using the low temperature sol gel approach, a cathode may be formed by mixing a lithium active material, an electrically conductive material, and the liquid sol gel precursor to form a homogenous mixture or paste. The cathode may be formed as either a thick pellet or as a thin casting containing the mixture of cathode components. The cathode is held together by the ion conductive glass electrolyte matrix that is formed by gelling and curing the sol-gel precursor solution. Curing temperature for the gelled precursor is in the range of 300° C., thus avoiding parasitic reactions.

However, construction of battery electrodes using the sol gel approach to produce glass electrolyte as a binder requires proper gelling, drying, and curing of the precursor. Gelling of precursors for LLTO and LLZO is a hygroscopic process. Moisture must diffuse into the cathode structure through the tortuous path formed by the densely packed cathode powder materials in order for the cathode material to gel properly throughout. Drying of the precursor after gelling may be time consuming because solvents and alcohols must diffuse through the gelled electrolyte within the tortuous compacted electrode powder structure.

The all-solid-state primary cell developed by Duracell and described above demonstrated very high energy densities of up to 1000 Wh/L and excellent performance in terms of safety, stability, and low self-discharge. However, due to the pressed powder construction and the requirement for a thick electrolyte separation layer, the cell impedance was very high, severely limiting the discharge rate of the battery. This type of cell is also restricted in application because the electrochemical window is limited to less than three volts due to the iodide ions in the electrolyte, which are oxidized above approximately three volts. In addition, a stable rechargeable version of this cell was never developed.

The all-solid-state thin film battery developed by Oak Ridge National Laboratories, also detailed above, addresses many of the problems associated with Li-ion technology, but also has limitations. The vacuum deposition equipment required to fabricate the cells is very expensive and the deposition rates are slow, leading to very high manufacturing costs. Also, in order to take advantage of the high energy density and power density afforded by use of the thin films, it is necessary to deposit the films on a substrate that is much thinner and lighter than the battery layers themselves so that the battery layers make up a significant portion of the volume and weight of the battery compared to the inert substrate and packaging components. Ideally, one would simply use thicker battery electrode layers and thereby make the substrate a less significant percentage of the battery's volume; however, it is not practical to increase the electrode thickness beyond a few microns. Low lithium diffusion rates coupled with thick electrode layers result in an impractical battery with low charge and discharge rates. Therefore the films must be deposited on very thin substrates (<10 μm) or multiple batteries must be built up on a single substrate, which leads to problems with maintaining low interface impedance with the electrolyte during the required high temperature annealing of the cathode material after deposition.

Metal oxide electrolytes having conductivities in the range of $10^{-3}$ S/cm have been fabricated. However, the use of such materials as solid electrolytes in all-solid-state batteries has been limited, in part due to the high interface impedance that results from the high temperature sintering process used to form bonds between the electrolyte and active cathode materials. While bonding is needed to enable lithium ion conduction between the materials, inter-atomic migration during sintering results in very high interface impedance and very limited functionality of resulting cells.

Even though solid state batteries have been made by homogenous mixtures of electrolyte and active material powders and bonded together using low temperature processing to yield low interface impedance, improved charge/discharge rate capability, and access to the full capacity of thicker cathodes has remained very limited. FIG. 1 shows the various layers of a solid state cell, including cathode current collector 8, cathode 6, electrolyte separator 4, and anode layer 2 constructed using the prior state of the art approach. In the expanded view, solid electrolyte particles 12 are shown embedded within cathode active material 10.

Cathode 6 is constructed having enough solid electrolyte material 12 to achieve percolation such that there is a network of particles in contact with each other to achieve ionic conduction continuity. The standard construction procedure for the cathode is to mix the constituent cathode powder materials until the electrolyte particles are relatively homogenously distributed. The relatively uniform, but random, distribution is maintained during construction of the battery cell such that the configuration shown in FIG. 1 is representative of a completed battery in accordance with the prior art. It illustrates some of challenges faced with constructing solid state cells, particularly those with relatively thick cathodes. Because of the random mixing process, some percentage of the electrolyte material, particles and group of particles, will naturally be surrounded by active cathode material and thereby isolated from the electrolyte network, as illustrated by particles 14. These isolated particles cannot participate in transporting lithium ions into the cathode from the separator. For example, consider lithium ion 22 conducted through electrolyte layer 4. It continues a conductive path through electrolyte particle 24. It receives an electron 18 or 20 and transitions into active material 10. In receiving an electron, it returns to its full lithium state 26 and intercalates into the cathode material 10 by diffusion. Once in a full lithium state, the atom cannot enter an electrolyte particle 25, release an electro 28, and have that electron conduct via a parallel path 28 so that it is reconstituted as lithium at 30, thereby conducting deep within the cathode. Once intercalated as lithium into the active cathode material, its transport within the cathode will be by diffusion, which is too slow for most applications.

Another problem is the limited cross sectional area where electrolyte particles connect to each other, as represented at 15. These areas of limited interface are like conduction choke points. They tend to cause increased impedance due to the small contact areas between particles.

Still another problem is represented by the network of particles 16. Ideally lithium ion 17 enters the network and is conducted through a series of interconnected particles to be intercalated into active material 10 at location 19. This is a tortuous path that is worsened by the fact that the ion must be conducted in a direction opposite to that of the electronic charge field to be intercalated at 19. It is not clear that this would occur, given the positive charge of the lithium ion.

The net effect is that solid state batteries with cathodes having a random distribution of conductive electrolyte and active particles display limited performance. Therefore, the need remains for a solid state cell structure and production process which provides high rate capability and effective transport of lithium within the structure of the resident electrode.

SUMMARY OF THE INVENTION

The invention is directed to a solid state battery comprising a cathode, a separator, and an anode, wherein at least one of the cathode and the anode comprises a sintered electrochemically active material, a first inorganic solid particulate electrolyte having high conductivity, and a first low melting point solid inorganic electrolyte, wherein the first inorganic solid particulate electrolyte has a particle diameter of about 100 nm to about 100 microns, and wherein the first low melting point solid inorganic electrolyte comprises a doped metal oxide containing at least one of boron and carbon.

The invention is further directed to an amorphous or glass-ceramic lithium ion conductive inorganic electrolyte comprising a doped metal oxide containing at least one of boron and carbon.

Further, the invention is directed to a method of making an amorphous or glass-ceramic inorganic electrolyte comprising a doped metal oxide containing at least one of carbon and boron, the method comprising forming a coating layer of a powder of the doped metal oxide on a substrate, heating the coated substrate to liquefy the powder, and quenching the coated substrate at a temperature below the melting point of the powder to form the amorphous or glass-ceramic electrolyte.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
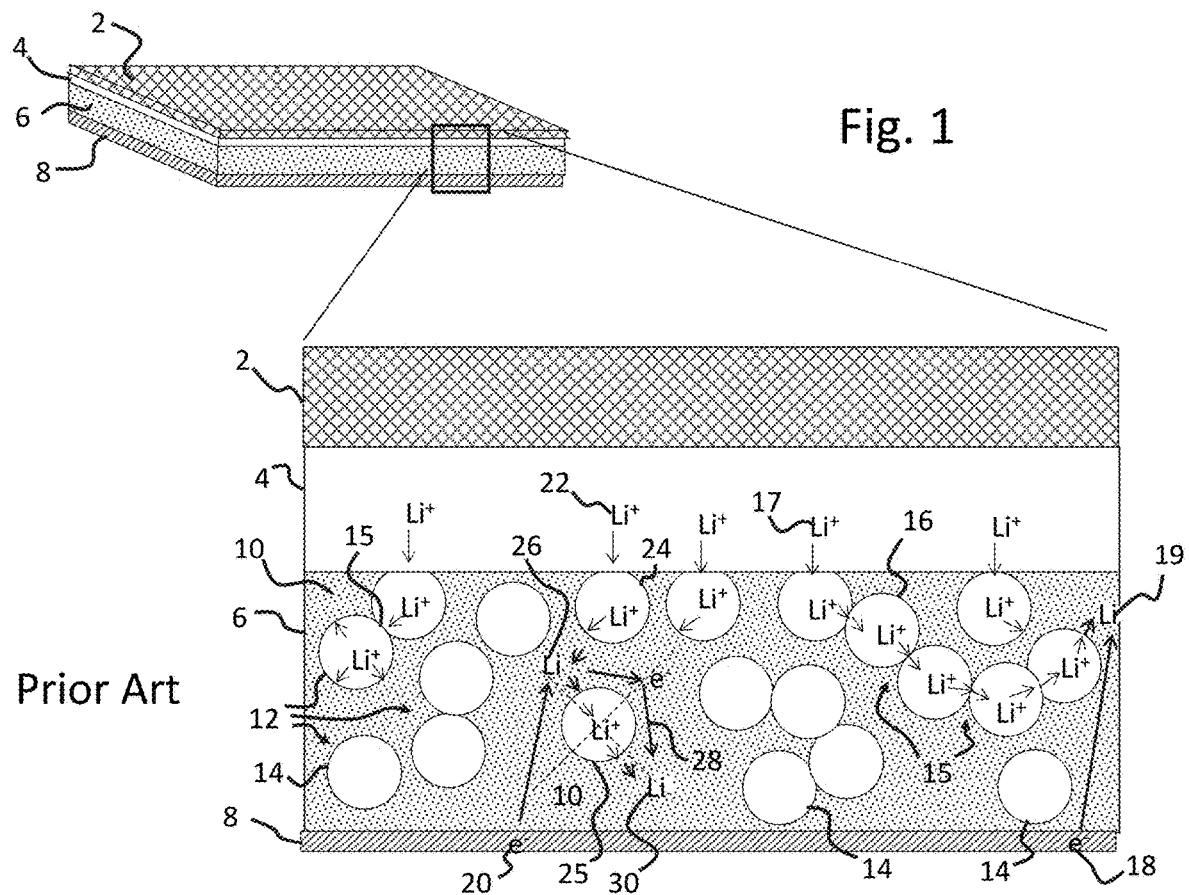
FIG. 1 is a schematic of a prior art solid state cell having a composite cathode.

The invention is directed, in part, to an all solid-state battery cell having thick lithium active electrodes relative to the thickness of the other components. The cell exhibits high "C" rate capability, where "C" rate is defined as the discharge current divided by the Amp-hour capacity of the battery. The present invention thus addresses the need in the art for improved lithium ion transport within solid state battery electrodes by providing a non-homogenous mixture of electrode active material and inorganic solid electrolyte material. The inorganic solid state electrolyte, preferably configured as relatively large particles which extend a substantial distance into the electrode, provides a non-tortuous ion conduction path. The particles extend to the electrode surface and are bonded to the electrolyte separator layer for ion conduction continuity. Such a configuration addresses the need for reduced tortuous conduction paths, elimination of conduction choke points, and an effective voltage field gradient to promote or motivate migration of ions through the electrolyte deep into the electrode. The invention further provides a cost efficient structure of continuous electrolyte extending into the cathode. The desired structure may be constructed by 3D printing of green ceramic materials comprising the electrolyte and active material features or, more preferably, by slurry casting of green ceramic tapes having the targeted features and particle size distribution.

More specifically, the invention is directed to solid state primary batteries, solid-state rechargeable (secondary) batteries, and components thereof. The solid state batteries according to the invention have composite electrodes which contain a lithium active material, an inorganic lithium ion conductive electrolyte having a relatively high melting point, and optionally a low melting point inorganic electrolyte material as a sintering aid and/or binder. The composite electrode may also include an electronically conductive additive material. For the purposes of this disclosure, the term "inorganic" may be understood to include materials which are metal oxide-based glass or ceramic materials. These materials preferably contain carbon but no hydrogen. Each of the battery components will be described in more detail below.

Solid Electrolyte-Electrode Composite

The solid electrolyte-electrode composite according to embodiments of the invention are also referred to herein as "inorganic composite electrodes" or simply "composite electrodes" and encompass both composite cathodes and composite anodes. For the purposes of this disclosure, unless otherwise noted, the terms "anode," "cathode," and "electrode" are used interchangeably.

The composite electrodes according to the invention contain sintered electrochemically active material and an inorganic solid particulate electrolyte having a relatively high melting point and high lithium ion conductivity. In one preferred embodiment, the composite electrode further contains an inorganic solid electrolyte having a relatively low melting temperature.

Preferably, the active material is present in the composite electrode in an amount of about 50-90% by volume. The total amount of electrolyte material in the composite electrode is preferably about 50-10% by volume relative to the total electrode volume. If present, the percentage of low melting point electrolyte is preferably up to about 10% by volume when used as a sintering aid and 5 to 50% by volume when used as a binder, relative to the total volume of the electrode.

When the composite electrode contains only active material and high melting point electrolyte, the components are, in a preferred embodiment, sintered in a structured geometry which provides non-torturous electrolyte conductive paths into the depth of the electrode. In other words, the sintering, as described in more detail below, involves heating just high enough that the particles come together and so that the particles of electrolyte are embedded within the electrode. Accordingly, most, if not all, of the electrode components have access to the large particles.

The term "sinter" does not refer to a high temperature process, but rather a process in which particles are fused together without liquefying them. The sintering is performed at a relatively low temperature, such as between 750° C. and 900° C., so that the electrode remains porous, but which results in the formation of good electronic conductive pathways. This relatively low temperature sintering process avoids problems associated with high temperature sintering, such as parasitic reactions and atomic diffusion and migration, which can lead to high interface impedances between lithium active materials and lithium electrolyte materials.

In a preferred embodiment, the composite cathode contains a second, relatively low melting point inorganic solid electrolyte which is described in more detail below. This electrolyte, which melts at about 300° C. to 850° C., more preferably about 400° to about 700° C., will generally have relatively low ion conductivity. This second electrolyte is included in the sintered electrode in molten form to fill the pores of the electrode subsequent to sintering. With cooling and solidification of the melt, it provides improved ion conductive coupling between the active electrode material and the ion conductive electrolyte and further acts a binder, improving the mechanical integrity of the cathode structure.

The second, low melting point solid inorganic electrolyte may also be included in the composite electrode as a sintering aid to help sinter the electrode active material and the lithium ion conductive electrolyte together. The sintering aid lowers the temperature needed to fuse the particles together. Sintering of the solid electrolyte and electrode active material preferably results in a structured geometry that provides non-torturous electrolyte conductive paths into the electrode's depth.

With the addition of a low melting temperature sintering aid, the cathode may be formed at a lower temperature than without the sintering aid (about 750° C. to about 950° C.), such as between 400° C. and 700° C., to form good electronic conductive pathways. A denser cathode structure is achieved with this approach. That is, the active material is cast and calendared with a lower percentage of the low melting temperature electrolyte, such that melting of the low melting temperature electrolyte provides initial bonding of the cathode structure, while at the same time leaving a less voided structure. In addition to using the second electrolyte as a sintering aid, it may also be inserted into the sintered electrode in molten form to fill the pores of the electrode subsequent to sintering, as described above. Thus, the second electrolyte may be included in the composite electrode at two different points during the manufacturing process to serve two different roles or functions.

Each type of electrolyte in the composite electrode serves a different function. Specifically, the highly ionically conductive electrolyte component which is dispersed within the electrode provides low impedance for conduction of lithium ions throughout the structure of the electrode, thus providing a cell with high charge and discharge rate capability. The low melting temperature electrolyte primarily forms thin interface layers between the component particles to minimize the overall ionic impedance of the electrode, lowers the bonding temperature, prevents unwanted parasitic reactions when used for initial bonding, and subsequently acts as a binder upon infiltration. The low melting point electrolyte also acts as a sintering aid as described above.

Accordingly, the different functional roles of the two electrolytes enable the construction of relatively thick, low impedance electrodes. If the electrode has a standalone structure such as a wafer or pellet, a current collector (aluminum, nickel, copper, or similar metal) may be sputtered, evaporated, or hot pressed onto the composite electrode as a coating to provide electrical contact. Optionally the electrode may be deposited on or bonded to metal foils. The composite electrode according to the invention exhibits high packing density of about 70 to 97%. The composite electrodes according to the invention are amorphous or glass-ceramic in preferred embodiments.

Electrochemically Active Material

The electrochemically active material is preferably inorganic and is more preferably lithium-based, such as, without limitation, lithium nickel cobalt manganese oxide (NCM), lithium titanium oxide (LTO), lithium nickel oxide (LNO), lithium cobalt oxide (LCO), or lithium manganese oxide (LMO); the most preferred is NCM. Other lithium-based electrochemically active materials which are known in the art or to be developed are also within the scope of the invention. The particle size of the electrochemically active material is preferably less than about 5 μm, more preferably less than about 1 μm, depending on the application of the battery. The active material selected for inclusion in a given electrode may be selected based on the desired operating voltage and capacity and whether the intended function of the composite electrode is as a cathode or an anode in the final battery cell. Appropriate electrochemically active materials are commercially available.

Low Melting Point Electrolyte

The relatively low melting point (also referred to as melting temperature) inorganic solid electrolyte component preferably has a melting temperature of about 300° C. to 850° C. (673-973K), more preferably about 400° to about 700° C. The low melting point solid inorganic electrolyte preferably comprises a doped metal oxide containing at least one of boron and carbon; the most preferred metal oxide is lithium oxide. The metal oxide may be doped with an element such as, without limitation, silicon, fluorine, germanium, or sulfur, or with a compound such as lithium fluoride, silicon dioxide, lithium metaborate, or lithium orthoborate. When the electrolyte contains a dopant, it is preferably contained in an amount of about 0.1 to about 20 atomic percent, more preferably about 1 to about 20 atomic percent, even more preferably about 5 to about 15 atomic percent, most preferably about 8 to about 12 atomic percent.

Appropriate low melting point electrolytes include, for example, lithium metaborate, lithium orthoborate, lithium tetraborate, LiPON in bulk form, lithium fluoride doped lithium metaborate, silicon doped lithium tetraborate, lithium metaborate doped lithium carbonate ($LiBO_2$—

$Li_2CO_3$), lithium orthoborate doped lithium carbonate ($Li_3BO_3$—$Li_2CO_3$), lithium carbonate doped lithium orthoborate ($Li_2CO_3$—$Li_3BO_3$), silicon dioxide doped $Li_3BO_3$—$Li_2CO_3$ ($SiO_2$—$Li_3BO_3$—$Li_2CO_3$), and lithium fluoride doped $Li_3BO_3$—$Li_2CO_3$ (LiF—$Li_3BO_3$—$Li_2CO_3$). Most preferred low melting temperature electrolytes include $Li_2CO_3$—$Li_3BO_3$ (referred to herein as "LBCO") and $Li_3BO_3$—$Li_2CO_3$ (referred to herein as "LCBO"), which has a melting temperature of 700° C. Amorphous or glass-ceramic lithium ion conductive inorganic electrolytes comprising doped metal oxides containing boron and/or carbon, such as lithium carbonate doped with lithium othoborate and lithium orthoborate doped with lithium carbonate, are preferred embodiments of the present invention, including an electrolyte having formula $Li_{9.3}C_3BO_{12.5}$.

Other preferred materials include LCBFO (LCBO doped with fluorine), LCBSO (LCBO doped with sulfur), LBCSiO (LCBO doped with silicon), LBCSiFO (LBCSiO doped with fluorine) and LBCGeO (LCBO doped with germanium), as well as LBCSO (LBCO doped with sulfur), LCBSiO (LBCO doped with silicon), LCBSiFO (LCBSiO doped with fluorine, and LCBGeO (LBCO doped with germanium). Appropriate low melting point electrolytes are commercially available or may be prepared by known methods.

In a preferred embodiment, the inorganic solid electrolyte has general formula $N_vN'_wN''_xN'''_yN''''_z$. In this formula, N represents at least one element selected from Group IA of the Periodic Table, preferably Li, N' represents at least one element selected from Group IVA of the Periodic Table, preferably carbon, N" represents at least one element from Group IIIA of the Periodic Table, preferably boron, N'" represents at least one element from Group VIA of the Periodic Table, preferably oxygen, and N"" represents at least one dopant selected from Groups IA-VIIA of the Periodic Table and transitional metals, preferably silicon, sulfur, germanium, or fluorine.

In this formula, v, w, x, y, and z are each zero or positive numbers including various combinations of integers and fractions or decimals. In a preferred embodiments N, N', N", N'", and N"" represent lithium, carbon, boron, oxygen, and silicon, respectively. In a second preferred embodiment, N, N', N", and N'" represent lithium, carbon, boron, oxygen and silicon, respectively, and z=0. In preferred embodiments, the electrolyte contains carbon and/or boron, as well as oxygen, and none of v, z, x, y, and z is zero.

Exemplary lithium ion conductive electrolytes which exhibit usable conductivity and favorable melting temperature characteristics are shown in Tables 1 and 2, but low melting point electrolytes which may be used in the invention are not limited to those listed. It is noted that the melting point of metal oxides is generally about 200 to 300° C. higher than their corresponding glass transition temperature. Additionally, in the formulas for the materials in Table 1, the components are listed in decreasing order of content in the material, with the exception of oxygen. That is, LCBO would contain more carbon than boron, whereas LBCO would contain more boron than carbon.

TABLE 1

Exemplary low melting temperature electrolytes

| Material* | Crystalline conductivity (S/cm) | Roll Quenched conductivity (S/cm) | Approx. Melting Point (° C.) |
|---|---|---|---|
| Base LCBO | $1 \times 10^{-6}$ | $4.56 \times 10^{-6}$ | 700 |
| LCBO—F (trace Si) | $2 \times 10^{-7}$ | $3.00 \times 10^{-6}$ | 560-585 |
| LCBSO | $3.6 \times 10^{-6}$ | $1.00 \times 10^{-5}$ | 590-600 |
| LBCSiO | $8.74 \times 10^{-6}$ | $5.55 \times 10^{-5}$ | 750-800 |
| LBCSiO—F | $1.79 \times 10^{-6}$ | $2.18 \times 10^{-5}$ | 620-660 |
| LBCGeO | $1 \times 10^{-5}$ | $6.51 \times 10^{-5}$ | 750-800 |

*(LCBO is $Li_2CO_3$ doped with $Li_3BO_3$), (LCBFO is LCBO doped with F), (LCBSO is LCBO doped with S), (LBCSiO is LCBO doped with Si), (LBCSiFO is LBCSiO doped with F) and (LBCGeO is LCBO doped with Ge).

TABLE 2

Exemplary low melting temperature electrolytes

| Composition (mole %) | Glass Transition Temperature ($T_g$, ° C.) | σ (S/cm) (T, ° C.) |
|---|---|---|
| $Li_2O$—$MoO_3$ (33.3-66.67) | 220 | 1e-5 S/cm (64° C.) |
| $Li_2O$—$WO_3$ (33.3-66.67) | 340 | 1.17e-5 S/cm (64° C.) |
| LiBr—$Li_2O$—$WO_3$ (10-45-45) | 320 | 2e-5 S/cm (64° C.) |
| LiBr—$Li_2O$—$B_2O_3$—$P_2O_5$ (35-26-13-26) | 320 | 1.2e-6 S/cm (25° C.) |
| $LiBO_2$—LiF (44-56) | 600 (melting temperature) | 1e-6 S/cm (25° C.) |
| $Li_3BO_3$ (LBO) | 680 (melting temperature) | 1.0e-6 S/cm (150° C.) |
| $Li_{9.3}C_3BO_{12.5}$ | 700 (melting temperature) | 1.1e-6 S/cm |
| $Li_6C_2BFO_8$ | 600 (melting temperature) | 6.0e-7 S/cm |
| $LiPO_3$ | 301 | 1.e-7 S/cm (25° C.) |
| LiPON | 301 | 1.2e-6 S/cm (25° C.) |

Although the exemplary electrolytes may have low ionic conductivities, their low melting temperatures make them suitable for effectively bonding with and forming low ionic impedance interfaces with lithium active battery materials and with other, faster lithium ion conductive materials. Thus, such low melting point materials may be heated to a molten or near molten state and interfaced with lithium active materials without the inter-atomic migration problems typically associated with high temperature sintering, a problem which, until now, has limited the practical construction of high performance all-solid-state batteries. Such electrolytes are thus included in the electrode to serve as a binding agent or sintering aid for the active material and other components of the electrode. That is, the low melting temperature electrolyte serves as a glue which, when melted, flows between powder particles and establishes good contacts. When solidified, the low melting point electrolyte serves to connect the particles together.

High Ionic Conductivity Electrolyte

In addition to the electrochemically active material and optional low melting temperature electrolyte, the composite electrode includes a high ionic conductivity solid particulate inorganic electrolyte to facilitate faster ionic transport through the body of the cathode. As previously explained, typical low melting point electrolytes do not have high ionic conductivities.

The term "high ionic conductivity" may be understood to refer to conductivities greater than about $5 \times 10^{-5}$ S/cm. Exemplary high ionic conductivity solid electrolytes include LLTO (lithium lanthanum titanium oxide ($Li_{3x}La_{2/3-x}TiO_3$ (x=0.11)), LLZO (lithium lanthanum zirconium oxide (garnet, $Li_7La_3Zr_2O_{12}$)), LLBO (lithium lanthanum bismuth oxide), or a similar solid-state, metal oxide based electrolyte exhibiting high lithium ion conductivity. Lithium lanthanum zirconium oxide is preferred. The high ionic conductivity electrolytes included in the composite electrode typically have high melting points, which may be understood to refer to melting points greater than about 800° C. (1073K).

The high melting point electrolyte is present in the form of large particles having diameters in the micrometer to nanometer range, more preferably in the micrometer range. More preferably, the particles have diameters of about 100 nanometers to about 1 mm, even more preferably about 100 nm to about 100 microns, even more preferably about 1 to about 100 microns, even more preferably about 20 to about 50 microns, most preferably about 30 to about 50 microns. Using large particles, as much of the active material in the electrode can be in contact with the high melting point electrolyte as possible.

Unlike the low melting point electrolyte which melts and reflows, the high melting point electrolyte remains as discrete particles in the electrode. The shape of the particles is not limited and may be cylindrical, spherical, or other shapes. A cylindrical shape is preferred because it results in greater surface area for the electrode material to contact the large electrolyte particles. It is preferred if the particle diameter comprises a significant portion of the electrolyte layer, such as about 60 to 80%. For example, a 50 μm electrode layer would preferably contain electrolyte having particle diameter of about 40 μm. Using such a relationship, the electrolyte particles would, due to the casting process employed, typically extend just above the top surface of the electrode where it touches the separator, thus providing ionic conductivity from electrode to separator. In one embodiment, the cathode and anode are disposed on opposing sides of the separator, and the particulate electrolyte particles contained in the cathode and/or the anode extend into the separator.

Additional Electrode Component

The composite electrode may optionally contain an electronically conductive material in an amount of up to about 5% by mass to enhance conduction of electrons. The terms "electronically" or "electrically" generally refer to the conduction of electrons rather than ions. Exemplary electronically conductive materials include, without limitation, cobalt oxide, carbon black, carbon nanotubes, silver, aluminum zinc oxide, doped silicon oxide, aluminum doped zinc oxide, etc. This component, if present, provides low impedance for the transport of electrons throughout the electrode to allow for high rate capability.

Preparation of Composite Electrode

The composite electrode may be constructed as a stand-alone wafer or pellet, or may be fabricated as a thin coating applied to a substrate, such as a metal foil which may function as a cathode current collector. For the purposes of this disclosure, the terms "wafer" and "pellet" are not meant to be limiting, and may refer to any desired shape or form.

The desired electrode structure may be formed using an additive manufacturing process such as three dimensional (3-D) printing whereby lithium active material and electrolyte material are deposited in a predetermined pattern relative to each other. Without being limited by these examples, the desired patterning may be accomplished using existing suitable 3-D printing technology, including aerosol jet spray, patterned slurry printing or multilayered patterned casting and tape casting.

In the slurry approach, the slurry is formed by mixing the cathode electrode materials with a solvent and optionally an organic polymer binder. Appropriate binders are well known in the art and typically contain a low molecular weight polymer, such as the preferred poly vinyl butyral (PVB) and poly vinyl alcohol (PVA). The solvent may be any solvent in which the polymer is soluble, such as the preferred ethanol and xylene. The resulting slurry (containing composite cathode materials, solvent, and optionally binder) is then cast onto a non-stick substrate such as polyester sheet material using a doctor blade technique, spin coating technique, spray coating technique, printing technique, or the equivalent thereof. The coating is then allowed to dry by evaporation of the solvent. The solvent may be evaporated by heating. The resulting casting in tape form may be removed from the casting surface.

Figure 2:
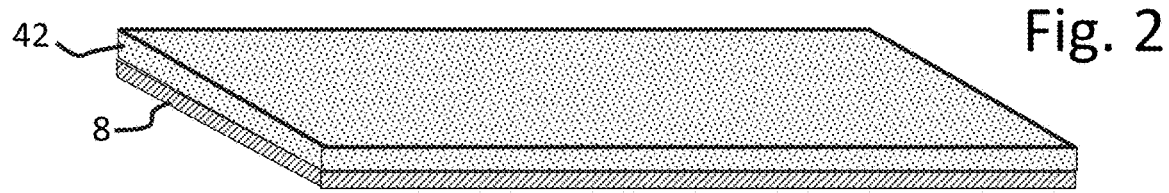
FIG. 2 is a schematic of a cathode casted onto a current collector substrate according to an embodiment of the invention.

FIG. 2 depicts casting surface 8 coated with cathode layer 42 which may be applied using the conventional approach of casting a slurry using a doctor blade. The slurry contains active electrode material and highly conductive solid electrolyte, and may also include an electronically conductive additive and/or a low melting temperature electrolyte material as previously described. To form the slurry, the components, preferably in powder form, are mixed together in the solvent to form a homogeneous distribution, preferably without a polymer binder. The resulting mixture is then doctor blade cast onto the casting surface. At this stage, the casting is preferably not yet removed from the casting surface.

Figure 3:
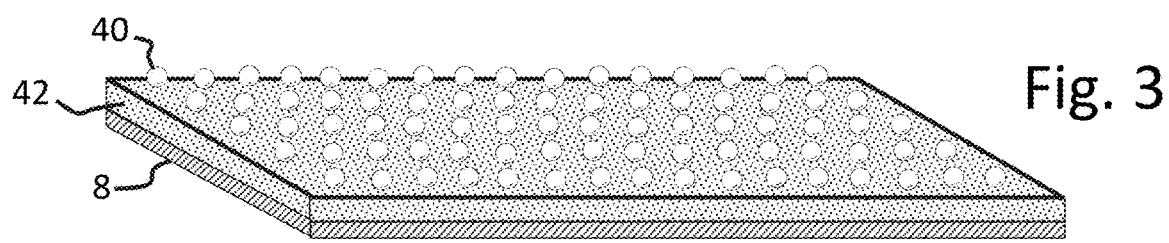
FIG. 3 depicts large particles of electrolyte distributed across the surface of a solid state cathode according to a further embodiment of the invention.

FIG. 3 depicts the next step in a casting sequence for constructing a solid state battery according to an embodiment of the invention. A second slurry is made by mixing large electrolyte powder particles of high conductivity electrolyte together with a solvent and a low molecular weight polymer binder, such as the preferred poly vinyl butyral (PVB) or poly vinyl alcohol (PVA). The solvent may be any solvent in which the polymer is soluble, such as the preferred xylene. The components are mixed to form a homogeneous distribution of the large electrolyte particles throughout the mixture. The resulting mixture is then doctor blade cast on top of the previously casted cathode material 42. The binder and solvent of this second casting diffuses into the first casting layer. As the solvent evaporates, the binder bonds the two layers together. As shown in FIG. 3, the process results in large electrolyte particles 40 being relatively uniformly arranged across and bonded to the surface of original cathode casting 42.

Figure 4:
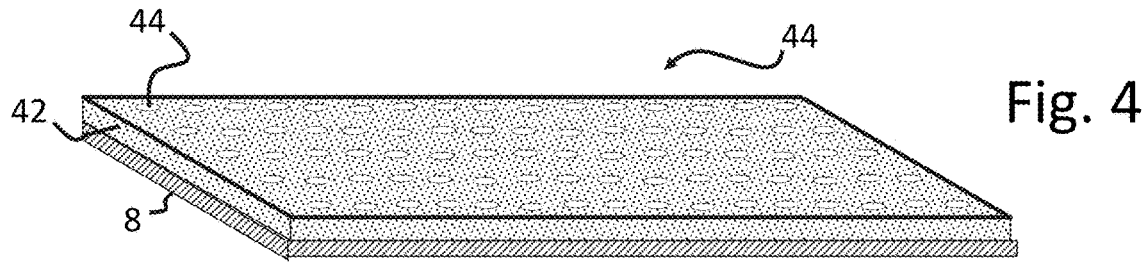
FIG. 4 is a schematic of a composite solid state cathode according to a further embodiment of the invention in which large particles of electrolyte are embedded within the surface of a cathode containing particles of active cathode material bonded together by a solid state electrolyte.

After solvent evaporation, the resulting tape is lifted from the casting surface. The large electrolyte particles are then pressed into the surface of the first casting. The pressing process is preferably achieved by calendaring the tape using a roll press. The process results in a cathode that has the appearance shown in FIG. 4, where the large electrolyte particles 44 are embedded in the cathode casting and exposed at the surface. In an alternate approach, the large electrolyte particles are cast first, followed by the active electrode material with binder as the top layer. In this way, the large electrolyte particles will be exposed on the bottom surface of the final cathode green tape once the solvent has evaporated and the tape is lifted from the casting surface. The resulting tape is then calendared as previously described.

The low melting temperature electrolyte, if present, also allows for a coated current collector configuration whereby the electrode component slurry may be spun, sprayed, doctor blade casted, printed, etc. directly onto a low temperature metallic current collector such as aluminum. It is also within the scope of the invention, however, for the slurry to be made without the low temperature electrolyte binder/sintering aid. The slurry may also be made without a polymer binder because it is supported by the metallic foil and it has been found that elimination of the polymer binder allows construction of a denser electrode.

In an embodiment when the electrode is made without the low melting temperature electrolyte binder/sintering aid, the electrode is roll calendared, followed by infiltration with the low melting temperature electrolyte at temperatures between 400° C. to 700° C. as previously described.

In embodiments when the slurry contains the low melting temperature electrolyte, it is also calendared and sintered in place on the metallic carrier surface at temperatures between 400° C. to 700° C. to reflow the electrolyte and form continuity. Optionally, the electrode may also be infiltrated with the low melting temperature electrolyte to further fill the pores and allow access to all the active materials, as described below. The electrodes according to the embodiments of the invention preferably have thicknesses of about 3 microns to 1 mm.

It is also within the scope of the invention to form the electrode or composite electrode directly onto the current collector or other substrate using a melt quenching process. Such an electrode is formed by first depositing the low melting temperature electrolyte on the substrate surface either in powder form or using a slurry of the electrolyte powder and a solvent. The solvent is evaporated, leaving an even distribution (coating layer) of the electrolyte powder on top of the substrate, which is then melted or softened to the liquid phase (liquefied). The substrate and melted electrolyte are then quenched, preferably at room temperature, such as by using a roller to form a dense, defect free electrode on top of the substrate with a thickness ranging from about 3 microns to 1 mm. It is further within the scope of the invention to prepare a free-standing electrode material (such as an electrode pellet) with no substrate and then perform the quenching process.

A quenched electrolyte has the advantage of forming either an amorphous or a glass-ceramic material as the electrode (or composite electrode) which has higher conductivity and increased density relative to known materials. Although room temperature quenching is preferred, it is also within the scope of the invention to perform the quenching at other temperatures below the melting point of the material. Thus, melt quenching changes the materials from crystalline, having sharp, well defined XRD (X-Ray Diffraction) peaks to glass ceramic (broad XRD peaks) or amorphous (no XRD peaks).

Infiltration of Cathode

In one embodiment, the composite electrode is prepared by infiltrating a sintered porous electrode with the low melting point electrolyte, as previously described, which acts as a binder to form continuous pathways between the high ion conductive electrolyte particles. This allows for deeper and faster access to the cathode active material. To form such an electrode, a slurry of the low melting temperature electrolyte and a solvent such as isopropanol is cast on top of the already formed electrode. Evaporation of the solvent from the casting leaves a dry powder coating of the low melting temperature electrolyte on the cathode surface. Next, the cathode is heated to 400° C. to 700° C., such as in an oven, to reflow the low melting temperature electrolyte, allowing it to migrate into the electrode under capillary force. It then cools to form a solid electrolyte with continuous paths throughout the depth of the electrode. A preferred electrolyte for this embodiment is $Li_3BO_3$—$Li_2CO_3$, which has melting temperature of 700° C.

When the electrode is coated onto a current collector, the infiltration process is the same as described previously. The preferred electrolyte for infiltration for this embodiment is LiF—$Li_3BO_3$—$Li_2CO_3$, because its low melting point of 600° C. allows the cathode to be coated onto inexpensive aluminum foil.

Separator

Figure 5:
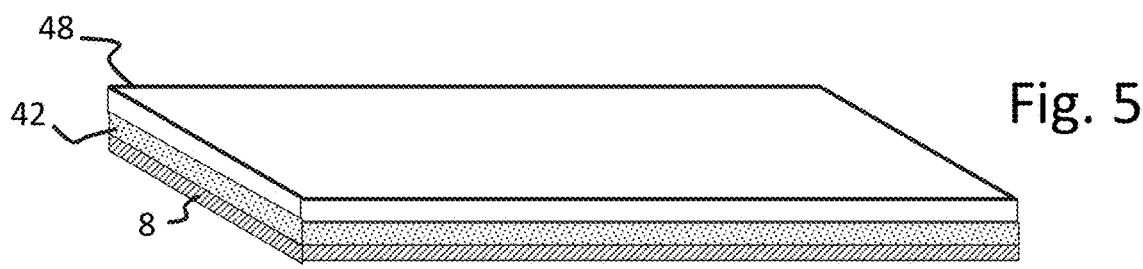
FIG. 5 depicts an electrolyte separator coating on top of a composite cathode having large electrolyte particles embedded in the cathode surface according to a further embodiment of the invention.

The solid state battery according to the invention further contains a separator in preferred embodiments, most preferably an amorphous or glass-ceramic separator. FIG. 5 shows separator coating 48 applied to the surface of cathode 42, which may be applied by magnetron sputter deposition. Lithium phosphorous oxynitride, LiPON, is a preferred electrolyte material for applying in thin film form by sputter deposition. The separator thickness is preferably about 3 μm to 50 μm.

An alternate approach is to form the separator using powder electrolyte material. In this approach, a high melting point, high ionic conductivity material such as LAGP, LATP, or the preferred LLZO (preferably in nano-powder form), with or without a sintering aid such as a low melting temperature electrolyte, is mixed with a solvent and optionally an organic polymer binder to form a separator slurry as previously described with respect to the electrode slurry. The high melting point material is preferably in particulate form and preferably has a particle diameter of about 100 nm to 1 mm as previously described with respect to the electrode.

Preferred low melting temperature electrolytes include the doped metal oxides containing carbon and/or boron as described above with respect to the electrolyte contained in the electrode and the descriptions above are also applicable to the low melting temperature electrolyte contained in the separator. The most preferred sintering aid electrolyte is $Li_3BO_3$—$Li_2CO_3$ due to its low melting temperature (700° C.) and high conductivity.

Appropriate binders are well known in the art and typically contain a low molecular weight polymer, such as the preferred poly vinyl butyral (PVB) and poly vinyl alcohol (PVA). The solvent may be any solvent in which the polymer is soluble, such as the preferred ethanol and xylene. A number of solvents are possible if a polymer binder is not employed. Isopropyl alcohol is most preferred when a polymer binder is not employed.

The resulting separator slurry is then coated onto the surface of the electrode which may or may not be pre-sintered at temperatures between 400 and 850° C. depending on the sintering aid, using a doctor blade technique, spin coating technique, spray coating technique, printing technique, etc. The coating is then allowed to dry by evaporation of the solvent. Aerosol spraying or dry powder spaying using a carrier gas is also a suitable technique for applying the desired coating layer. Construction of the layered electrode/separator structure is completed by sintering it in an oven at a temperature between 400 and 850° C., depending on the sintering aid as previously described.

The slurry containing LLZO and optionally sintering aid electrolyte may alternatively be coated onto a separate casting surface and subsequently removed as a "green" tape. The resulting separator tape may then be laminated with a previously formed cathode tape, such as that previously described. The separator is laminated to the cathode surface having the large electrolyte particles exposed. The cathode and separator tapes are layered together and then calendared by passing through a pair of compression rollers and then cut into individual discs or prismatic wafers of a desired cathode size. Subsequently, the cutouts are heated to about 400° C. to burnout or evaporate the binder material. Finally, the cutouts are placed in an oven and sintered at a temperature as previously described.

Alternatively, pristine LLZO powder may be densified by hot-pressing to form a defect free, 100% dense LLZO sheet. This sheet may be bonded to the sintered and infiltrated cathode using a bonding agent such as, without limitation, a low melting temperature electrolyte material as previously described.

Alternatively, a separator may be formed directly onto the electrode using a melting quenching method as previously described. Such a separator is formed by first depositing the low melting temperature electrolyte on the electrode surface in powder form or by using a slurry of the electrolyte powder and a solvent. The solvent is evaporated, leaving an even distribution of the electrolyte powder on top of the electrode, which is then melted or softened to the liquid phase (liquefied). The electrode and melted electrolyte are then quenched, preferably at room temperature, such as by using a roller to form a dense, defect free separator on top of the electrode with a thickness ranging from about 1 µm to 50 µm. A quenched electrolyte has the advantage of forming either an amorphous or a glass-ceramic material as the separator which has higher conductivity and increased density relative to known materials. Although room temperature quenching is preferred, it is also within the scope of the invention to perform the quenching at other temperatures below the melting point of the material. Thus, melt quenching changes the materials from crystalline, having sharp, well defined XRD peaks to glass ceramic (broad XRD peaks) or amorphous (no XRD peaks).

It has been found that such a method of melt quenching materials from the melting point to a temperature sufficiently lower than the melting point results in an amorphous or glass-ceramic material with increased ionic conductivity. The melting quenching method is preferably performed by roll quenching using a roller at speeds varying from 300 rpm to 3000 rpm, but more preferably about 700 rpm. As shown in Table 1, the base LCBO material when melt quenched to form a glass-ceramic exhibited an increase in conductivity of about four times compared to the known crystalline version of the material. In addition, as shown in Table 1, other materials also showed significant increase in conductivity as high as one order of magnitude when melt quenched. Thus, the method of melt quenching increases the conductivity of the resulting amorphous or glass-ceramic doped metal oxide by at least about three times, even by at least about five times, relative to the conductivity of the powder of the doped metal oxide prior to melt quenching.

Table 1 further shows that the base LCBO doped with sulphur showed an increase in conductivity and a lowered melting point to 600° C. This lower melting point makes the material form glass much easier when quenched, and improves workability in turns of lower reactivity with battery components. Similarly, the melt quenched fluorine doped LBCSiO had a significantly reduced melting point (from 800° C. to 660° C.) with only slight reduction in the conductivity, thus making the material more compatible with the active materials used in the cathode due to less parasitic reactions at these high temperatures.

In one embodiment, the low melting temperature electrolyte in the electrode is LCBO and the low melting temperature electrolyte in the separator is lithium fluoride doped LCBO, $Li_6C_2BFO_8$, which has a melting temperature of 600° C., 100° C. lower than that of the non-doped material. This difference in melting temperature between LCBO and $Li_6C_2BFO_8$ enables an electrode to be constructed which promotes ion conduction internal to the electrode while being unaffected by the lower melting temperature process of applying the coating of $Li_6C_2BFO_8$ to the surface of the electrode as a separator. That is, because the temperature required to melt the electrolyte in the separator is lower, the electrolyte in the electrode remains unaffected (does not melt).

In a further embodiment, as opposed to a sintered separator coating, the electrolyte powder applied to the surface of the electrode may be a second low melting temperature electrolyte material. Instead of sintering the separator, the coated electrode is heated to the melting temperature of the coating to produce a liquid film. The separator film is formed as the liquid cools and re-solidifies. In this example, the low melting temperature electrolyte may also be applied while in a molten state using a spin coating technique. This electrolyte may be any of the low melting temperature electrolytes previously described, and is most preferably $Li_3BO_3$—$Li_2CO_3$.

Solid-State Battery

A primary or secondary solid state battery according to the invention contains a composite electrode as previously described, a counter electrode, and a separator. For example, if the composite electrode is a composite cathode, a conventional anode, such as lithium metal, lithium alloy metal, or a lithium alloy precursor may be utilized. The separator may be as previously described and the metallic anode may be applied onto the separator by physical or vapor deposition under vacuum, such as by sputtering or thermal evaporation. Alternatively, the cell may be completed by applying a metal foil or coating such as copper to the surface of the electrolyte opposite the cathode so that a lithium free cell is formed. In this case, the lithium is plated between the foil and the electrolyte on initial charge to form the anode.

The anode may also be a composite electrode, as previously described. In one embodiment, the anode is cast onto an electrolyte coated cathode so that the battery has a Li-ion cell configuration in which a first composite electrode is formed using a Li ion intercalation compound having a low lithium reaction potential, such as lithium titanium oxide (LTO). A composite separator is formed using a low melting temperature glass electrolyte binder and a filler material as previously described. A second composite electrode is formed using a lithium intercalation material, such as lithium nickel cobalt manganese oxide (NCM) which has a higher reaction potential than the material used in the first electrode. The first composite electrode material may be used as an anode and the second composite electrode may be used as a cathode. The anode, the separator and the cathode materials are stacked to form a monolithic structure having the separator positioned between the anode and cathode. The stacked components may be heat treated at a temperature ranging from 400° C. to 700° C. Subsequently, the anode, electrolyte, and cathode multilayer structure is heated at a temperature sufficient to sinter the structure together or, in the case of a low melting temperature binder electrolyte, a temperature sufficient to reflow the electrolyte and bind the component electrodes and separator together.

Preferably, the melting temperature of the separator layer is lower than the melting temperature of the low melting temperature binder electrolyte employed in the cathode. The heat treatment will only melt the low melting temperature electrolyte used in the separator such that it bonds all the layers in the stack together.

Figure 6:
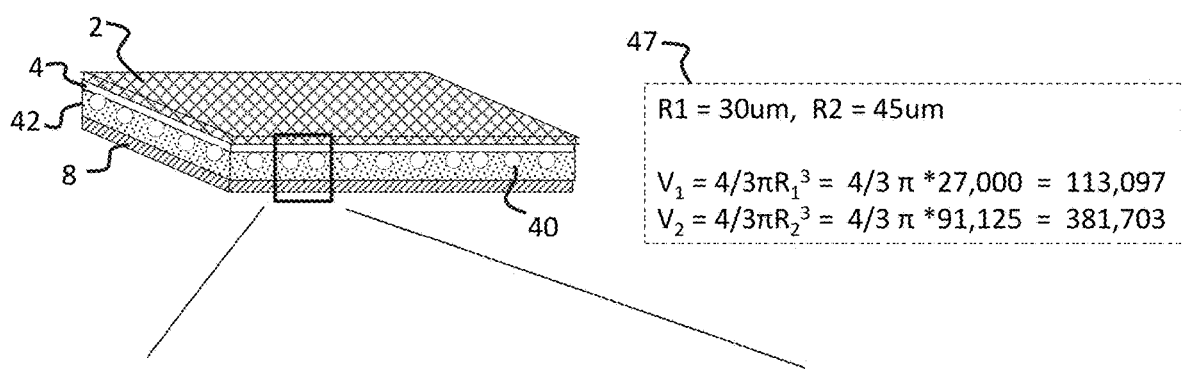
FIG. 6 is a schematic showing a cross-sectional view and an expanded view of a composite cathode having large electrolyte particles embedded in the cathode surface according to another embodiment of the invention.
Figure 6:
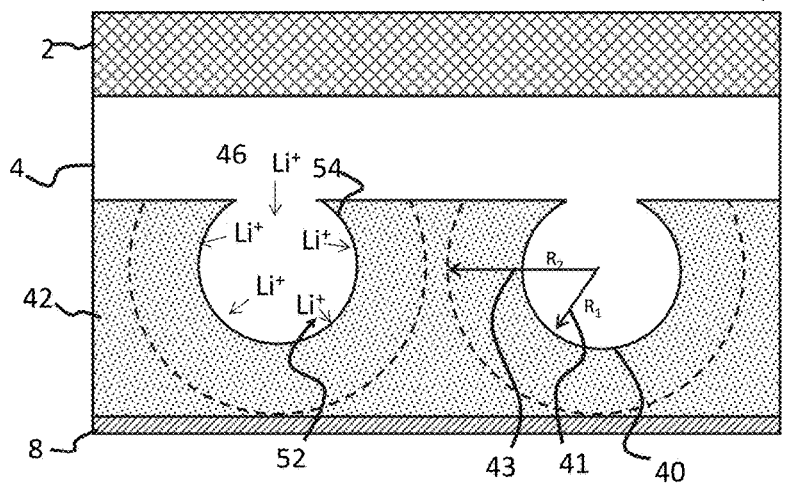

FIG. 6 shows a cross sectional view of a battery according to an embodiment of the invention. Electrolyte particles 54 extend separator layer 46 into cathode 42. Calculation 47 presents a geometric impression of the impact of the increased surface area of the separator. Although each particle is different and has a random shape, they are approximated as spherical for analytical convenience. The top portions of the particles are embedded as part of the separator. For further convenience, it is assumed that the depth which lithium ion 52 can effectively diffuse in and out of the cathode active material is 15 μm and that the distance from the center of the large electrolyte particle to the depth 43 which lithium can effectively diffuse is 45 μm. Thus, for an average electrolyte particle size of 30 μm for radius 41 and an active material thickness of 75 μm, the net accessible volume of active cathode material per particle can be approximated as 268,606 μm$^3$, less the volume cut off by the separator interface at the top surface of the cathode. This is significantly greater than the 121,500 μm$^3$ accessible by diffusion 15 μm into the cathode via a flat interface with the electrolyte.

Figure 7:
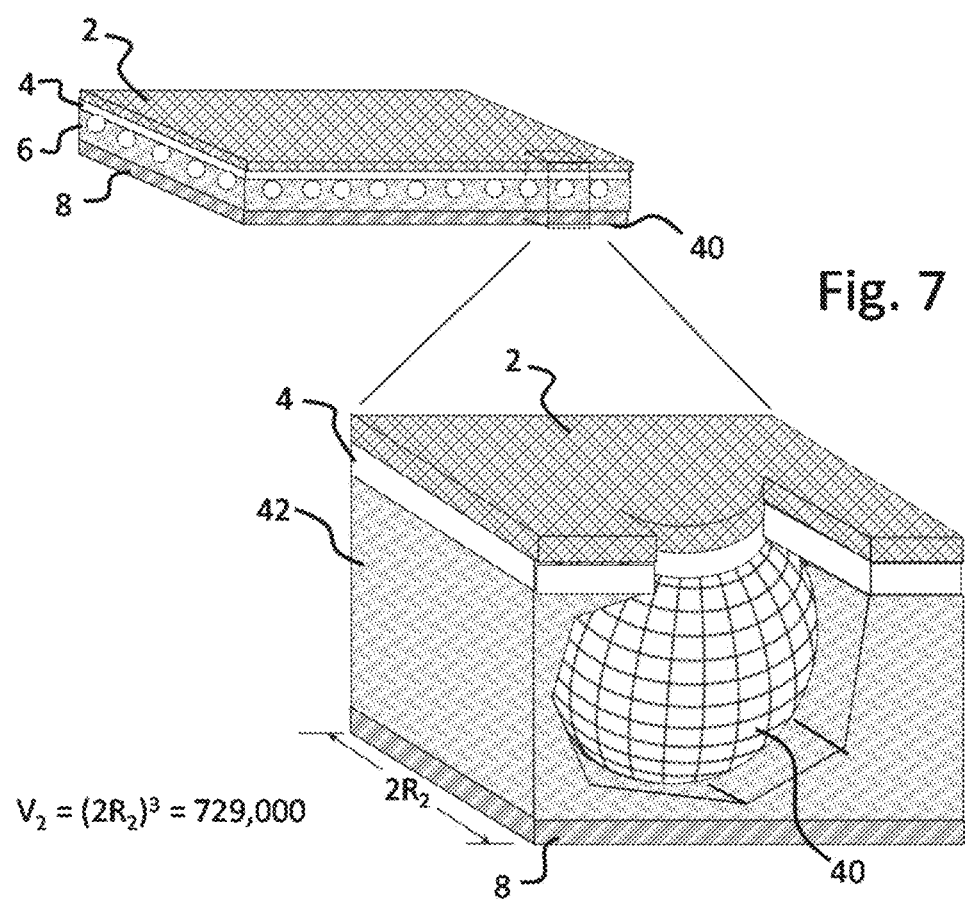
FIG. 7 is a schematic showing a cross-sectional and expanded three-dimensional view of a composite cathode having large electrolyte particles embedded in the cathode surface according to a further embodiment of the invention.

FIG. 7 shows a three dimensional depiction of structure surrounding an electrolyte particle. If it is assumed that the particle provides full access to an enclosing cubical volume, the net volume of cathode material accessed would be 615,903 μm$^3$ less the volume of active material displaced by the separator and less the volume cut off by the separator interface at the top surface of the cathode.

This invention will be further illustrated below in the following, non-limiting examples.

Example 1: Preparation and Analysis of Solid Electrolytes

A high conductivity electrolyte, LLZO (lithium lanthanum zirconium oxide (garnet, $Li_7La_3Zr_2O_{12}$)), was prepared as follows. 3.8 g of LiOH, 10 g of $La_2O_3$, 6 g of ZrO, 0.27 g of Al and 1.12 g of TaO were milled in THF. All components were obtained from commercial sources. The resulting mixture was dried under vacuum and then heated at 715° C. for 1 hour and at 900° C. for 3 hours. The resulting powder was pressed in a Carver press to form a pellet which was subsequently sintered at 1200° C. in oxygen. Thus, sintered pellets were removed from the furnace and ground into powder to provide the desired LLZO.

Figure 8:
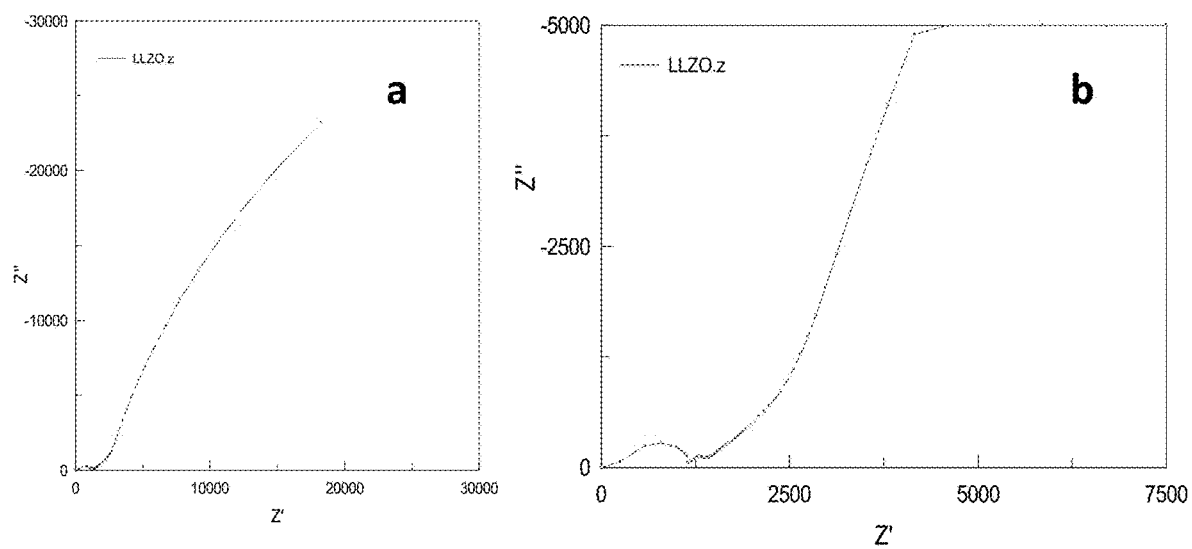
FIGS. 8a and b are Electrochemical Impedance Spectroscopy (EIS) spectra for a highly conductive solid electrolyte according to an embodiment of the invention.

LLZO impedance measurements are shown in FIGS. 8a and 8b. The graph in FIG. 8a represents the whole measured spectrum and the graph in FIG. 8b focuses on the high frequency portion. Based on these data, the estimated ionic conductivity of the LLZO is $5\times10^{-4}$ S/cm. Large LLZO particles are obtained by hot pressing LLZO powder at 1200° C. to sinter and form dense structures. The dense pellet was then broken into particles and separated using various ranges of sieves to obtain particles between 25 μm and 45 μm.

A low melting temperature electrolyte, $Li_3BO_3$:$Li_2CO_3$, lithium orthoborate doped lithium carbonate, having the formulation $Li_{9.3}C_3BO_{12.5}$ with a melting temperature of 700° C., was prepared by a solid state reaction as follows. $Li_3BO_3$ was produced by mixing 24.1 g of $Li_2O_2$ with 14.7 g of lithium tetraborate, both obtained from Sigma Aldrich. The powders were milled for 8 hours in 35 ml of THF. The resulting powder was dried on a hot plate for 3 hours at 80° C. and then in a vacuum oven for 22 hours at 120° C. The thus dried powder was placed in a tube furnace and heated at 580° C. under flowing oxygen for 10 hours to form a precursor to the desired lithium orthoborate powder.

To form $Li_3BO_3$:$Li_2CO_3$, lithium orthoborate precursor powder and lithium carbonate (Alfa Aeser product number 554-13-2) were mixed in a 1:2.76 wt % ratio and then hot pressed at 700° C. to form a dense composite electrolyte. An alternative to hot pressing the mixture to form the composite electrolyte would be to heat it to its melting point to form a homogenous molten mixture. After cooling, the resulting material was ground into a powder having a particle size of less than 3 μm.

Alternatively, to reduce the melting point of the $Li_3BO_3$:$Li_2CO_3$, it may be doped with lithium fluoride (LiF) in a 1:1:2.76 wt % (LiF:$Li_3BO_3$:$Li_2CO_3$). The precursors are then melted into a homogenous mixture to form the composite electrolyte on cooling.

Figure 9:
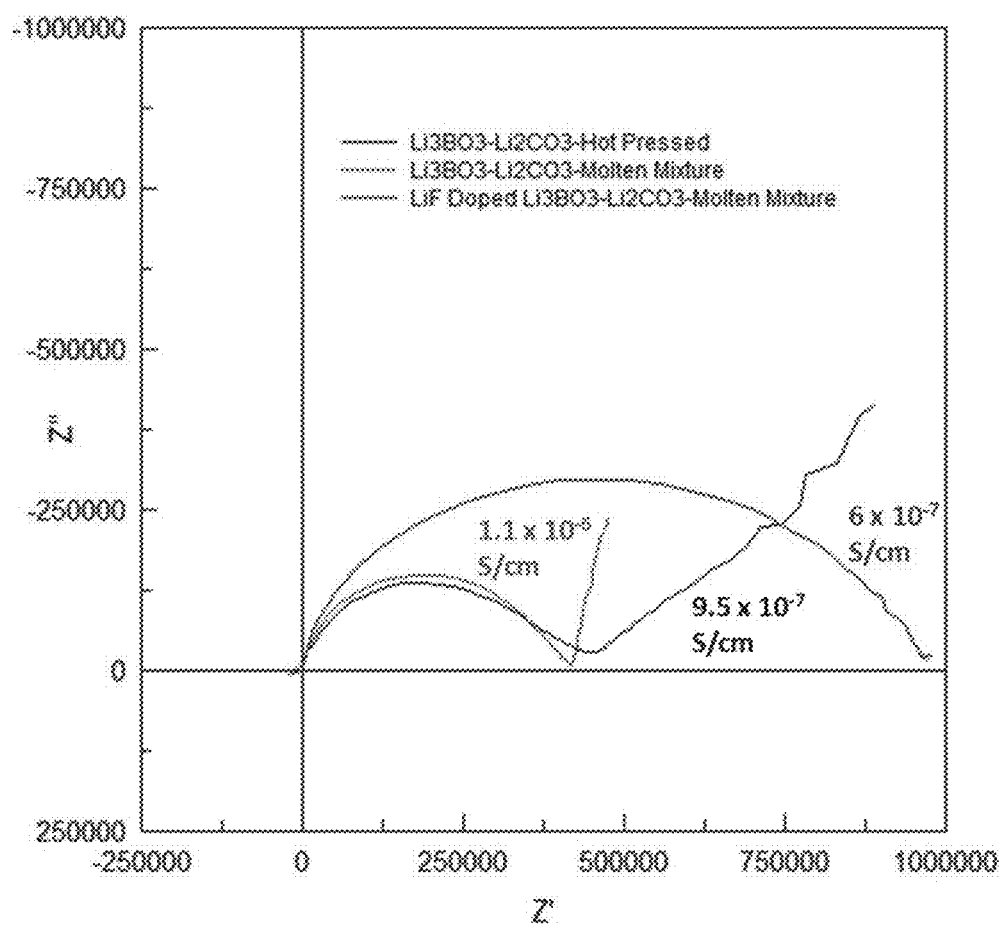
FIG. 9 is an Electrochemical Impedance Spectroscopy (EIS) spectrum for hot-pressed and melted boron doped lithium carbonate pellets ($Li_3BO_3:Li_2CO_3$) and melted LiF doped $Li_3BO_3:Li_2CO_3$ according to a further embodiment of the invention.

Conductivity measurements were made on pellets prior to grinding into final powders. Platinum was sputtered on both sides of pellets to provide electrical contact. Impedance measurements were made using a Solartron 1260 instrument. The impedance spectrum of the hot-pressed and melted boron doped lithium carbonate pellets ($Li_3BO_3$:$Li_2CO_3$) and melted LiF doped $Li_3BO_3$:$Li_2CO_3$ are shown in FIG. 9. The graph represents the entire measured spectrum. Based on the impedance data, the ionic conductivities of the hot-pressed $Li_3BO_3$:$Li_2CO_3$, melted $Li_3BO_3$:$Li_2CO_3$, and melted LiF doped $Li_3BO_3$:$Li_2CO_3$ pellets are estimated to be $1.1\times10{-6}$ S/cm, $9.5\times10{-7}$ S/cm and $6.0\times10{-7}$ S/cm, respectively at room temperature.

Example 2: Preparation of Cell Using NCM Cathode with Low Melting Temperature Electrolyte A mixture was prepared by high energy milling 4 g (61%) NCM active cathode material powder, (36 wt %) 2.4 g nano-sized (<0.3 μm average particle size) LLZO electrolyte (prepared in Example 1) and 0.2 g (3 wt %) polymer binder (PVB) with 1.5 ml of ethanol and 1.5 ml of xylene solvents. The mixture was then cast onto a non-stick, polyester sheet material and allowed to dry. Multiple castings were made and were subsequently calendared together to form a single multilayered sheet, with each layer being approximately 50 μm thick. Discs were punched from the sheet and then heated at 400° C. for 3 hours to remove the binder and then at 850° C. for 30 minutes to obtain a porous, sintered, cathode disc.

After sintering, a slurry of low melting temperature electrolyte was cast onto one surface of the cathode disc. The slurry was formed by mixing 0.2 g $Li_3BO_3$:$Li_2CO_3$ (prepared in Example 1) with 2 g of isopropanol solvent (IPA). Evaporation of the solvent from the casting left a dry powder coating of $Li_3BO_3$:$Li_2CO_3$ on the cathode surface. Next, the cathode was placed inside an oven at 700° C. to reflow the $Li_3BO_3$:$Li_2CO_3$, allowing it to migrate into the cathode under capillary force.

The now solid electrolyte infiltrated cathode was next coated with LiPON (commercially available from Kurt Lesker) by sputter deposition to form a separator. The cell was completed by evaporating a lithium seed layer onto the surface of the LiPON to form the anode.

Figure 10:
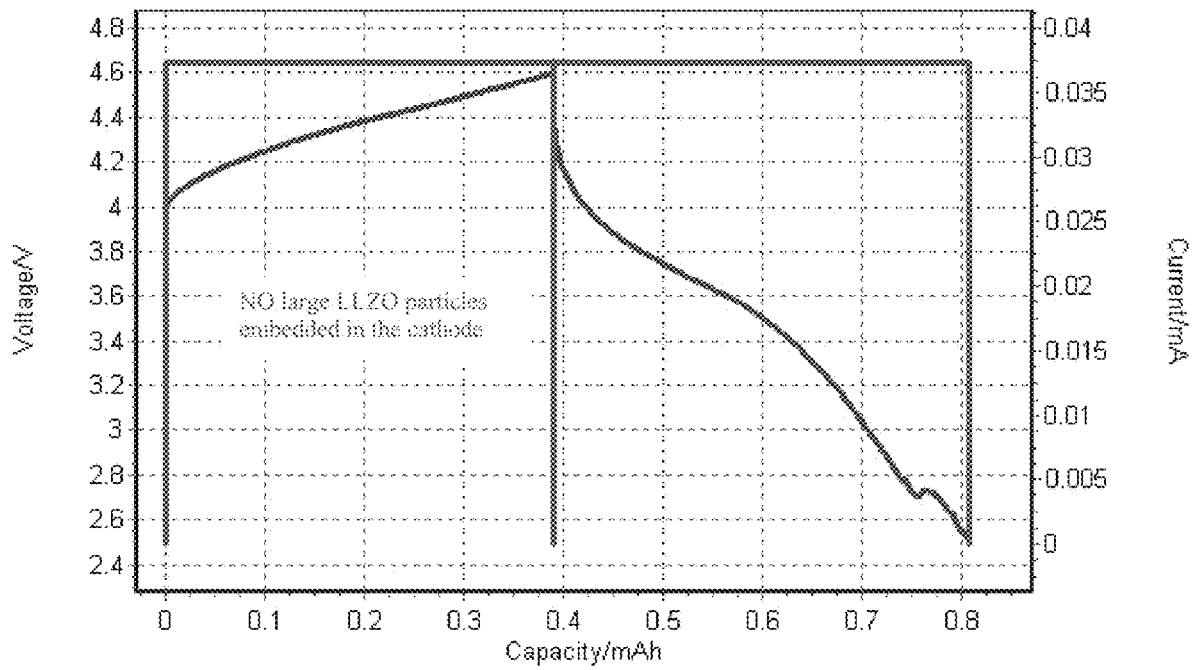
FIG. 10 is a graph of charge/discharge cycle data for a cell without large solid electrolyte particles embedded in the cathode according to an embodiment of the invention.
Figure 11:
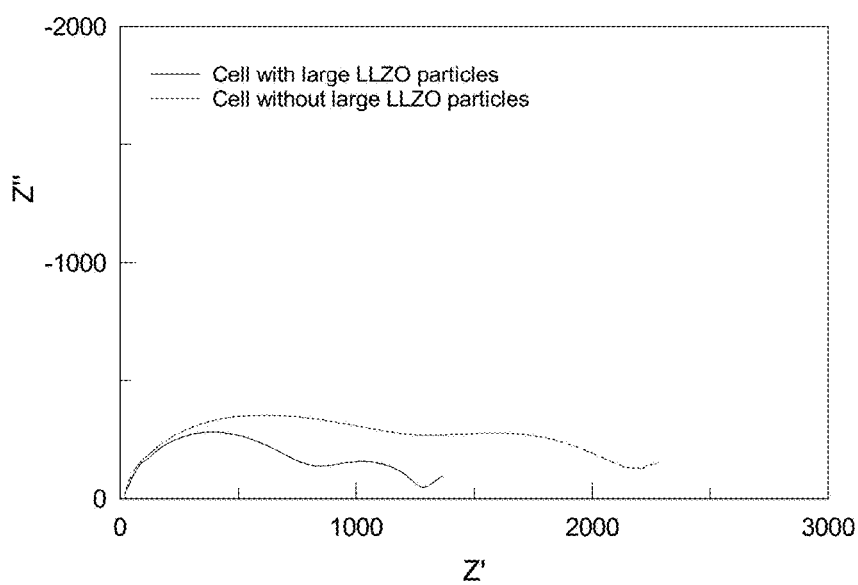
FIG. 11 is an Electrochemical Impedance Spectroscopy (EIS) spectrum for cells with and without large solid electrolyte particles embedded into the cathode.

The cell was tested and the resulting charge/discharge cycle data and impedance spectrum are shown in FIGS. 10 and 11, respectively. The charge/discharge cycle data in FIG. 10 shows that the discharge capacity of the cell is 400 μAh. The cell is tested at C/100 at room temperature. The corresponding EIS spectrum in FIG. 11 shows that the impedance of the cell without the large LLZO particles is about 2200 ohms.

Example 3: Preparation of Cell with NCM Cathode, Low Melting Temperature Electrolyte and High Surface Area Separator Interface A mixture was prepared by high energy milling 4 g (61%) NCM active cathode material powder, (36 wt %) 2.4 g nano-sized (<0.3 µm average particle size) LLZO electrolyte (prepared in Example 1) and 0.2 g (3 wt %) polymer binder (PVB) with 1.5 ml of ethanol and 1.5 ml of xylene solvents. The mixture was cast onto a non-stick, polyester sheet material and allowed to dry. Multiple layers of the casting were calendared together into a single sheet for a more uniform distribution of particles, with each layer being approximately 100 µm thick prior to calendaring.

An LLZO separator was prepared by mixing nano-LLZO powder, approximately 25 nm, with large particle LLZO powder, 25 µm to 45 µm, in a 2 g/2 g (50/50 wt %) ratio with 0.28 g 7 wt % polymer binder (PVB), 1.6 ml of ethanol, and 1.6 ml of xylene solvents. The resulting slurry was doctor blade cast on to a non-stick surface as previously described and allowed to dry. The resulting film was removed from the casting surface and paired with and calendared together with the multilayered cathode sheet. Steel rollers were used for calendaring the casting. The calendaring process densifies the electrolyte layer pushing the particles therein closer to each other. Similarly, NCM particles in the cathode underlying cathode layer are pressed closer to each other, thus increasing the particle density of the cathode. The final thickness of the cathode was 80 µm, which results in the large LLZO electrolyte particle extending a significant distance from the surface deep into the cathode. Since the large particles in the separator are larger in diameter than the thickness of the separator, the larger particles end up protruding into the cathode layers, thus providing an increased interface roughness and less tortuous conductivity paths into the cathode.

Discs were punched from the sheet and then heated at 400° C. to remove the binder and then at 850° C. for 1 hour to obtain a porous, sintered, cathode disc with large particles of separator material embedded in and exposed at its surface.

After sintering, a slurry of low melting temperature electrolyte was cast onto one surface of the cathode disc. The slurry was formed by mixing 0.2 g $Li_3BO_3:Li_2CO_3$ (Example 1) with 2 g of isopropanol solvent. Evaporation of the solvent from the casting left a dry powder coating of $Li_3BO_3:Li_2CO_3$ on the cathode surface. Next, the cathode was placed in an oven at 700° C. to reflow the $Li_3BO_3:Li_2CO_3$, allowing it to migrate into the cathode under capillary force.

Figure 12:
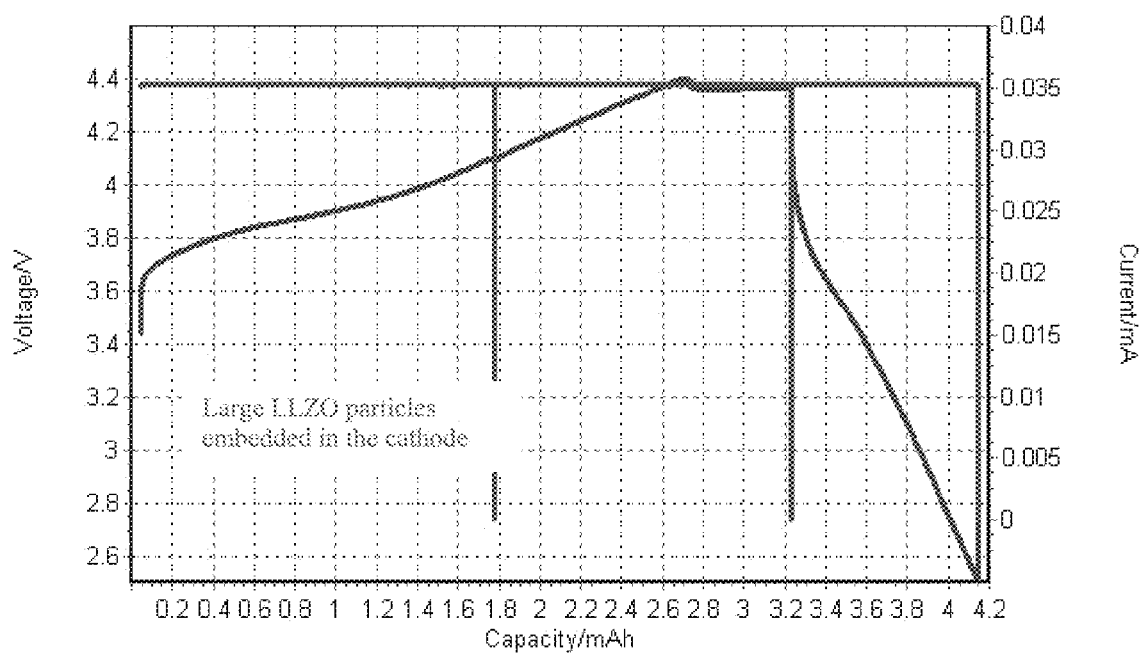
FIG. 12 is a graph of charge/discharge cycle data for a cell with large solid electrolyte particles embedded in the cathode according to an embodiment of the invention.

Subsequently, the LiPON separator material having a thickness of about 2.5 microns was deposited on a smooth side of the thin pellet by RF magnetron sputtering. The electrolyte coating directly contacts the exposed large LLZO particles embedded in the surface of the cathode. Finally, a Li metal anode was deposited on the LiPON by thermal evaporation in vacuum. The resulting cell was tested and the impedance spectrum was run using the Solartron and charge/discharge cycle data were taken using a Maccor battery cycler to yield the data shown in FIGS. 11 and 12. FIG. 11 shows that the cell with the large LLZO particles embedded into the cathode and making intimate contact with the LiPON separator had lower impedance than the cell without the large particles (approximately 1000 ohms lower). FIG. 12 shows that the charge and discharge capacity of the cell with the large LLZO particles was also significantly enhanced over the cell without the large LLZO particles. The theoretical capacity of both cells based on active material content is approximately the same. The cells were tested at the same C-rate (C/100) at room temperature.

Example 4: Preparation of Cathode Using NCM with LLZO Electrolyte (Nano-Sized and/or Large Particle Size) with and without $Li_3BO_3$—$Li_2CO_3$ Sintering Aid (a) Preparation of Cathode Using NCM with Nano-Sized (<0.3 µm Average Particle Size) LLZO Electrolyte Only A mixture was prepared by high energy milling 4 g (49%) NCM active cathode material powder, (49 wt %) 4 g nano-sized (<0.3 µm average particle size) LLZO electrolyte and 0.2 g (2 wt %) polymer binder (PVB) with 4 g of ethanol and 4 g of xylene solvents.

(b) Preparation of Cathode Using NCM with Nano-Sized (<0.3 µm Average Particle Size) and Large (25 µm to 45 µm Average Particle Size) LLZO Electrolyte A mixture was prepared by high energy milling 4 g (52%) NCM active cathode material powder, (46 wt %) 3.5 g nano-sized (<0.3 µm average particle size) LLZO electrolyte and 0.2 g (2 wt %) polymer binder (PVB) with 4 g of ethanol and 4 g of xylene solvents.

(c) Preparation of Cathode Using NCM, Nano-Sized (<0.3 µm Average Particle Size), Large (25 µm to 45 µm Average Particle Size) LLZO Electrolyte and Low Melting Temperature Electrolyte as Sintering Aid A mixture was prepared by high energy milling 4 g (50 wt %) NCM active cathode material powder, (44 wt %) 3.5 g nano-sized (<0.3 µm average particle size) LLZO electrolyte, (3 wt %) 0.25 g Li3BO3:Li2CO3 sintering aid and 0.2 g (3 wt %) polymer binder (PVB) with 4 g of ethanol and 4 g of xylene solvents.

Cathode mixtures a, b and c were each cast onto a non-stick, polyester sheet material and allowed to dry. The casting in the form of green tape was removed from the substrate stacks in layers and calendared together to form a single multilayered sheet, with each sheet being approximately 30 µm thick. Discs were punched from the sheet and then heated at 400° C. for 3 hours to remove the binder. Subsequently the cathode samples from Examples a and b were sintered at 850° C. for 30 minutes while Example 4c was sintered at 700° C. for 30 mins to obtain a porous, sintered, cathode disc. The $Li_3BO_3$—$Li_2CO_3$ sintering aid in example 4c allows the cathode to be sufficiently sintered at 700° C., 150° C. lower than the sintering temperature of Examples 4 a and b without the binder. Lower sintering temperature reduces parasitic reactions between the NCM active material and LLZO electrolyte thus improving the charge transfer.

After sintering, a slurry of low melting temperature electrolyte was cast onto one surface of each cathode disc. The slurry was formed by mixing 0.2 g of $Li_3BO_3:Li_2CO_3$ with 2 g of isopropanol solvent. Evaporation of the solvent from the casting left a dry powder coating of $Li_3BO_3:Li_2CO_3$ on the cathode surface. Next, the cathodes were placed in an oven at 700° C. to reflow the $Li_3BO_3:Li_2CO_3$, allowing it to migrate into the cathode under capillary force.

The now solid electrolyte infiltrated cathodes were next coated with LiPON by sputter deposition to form a separator. The cells were completed by evaporating a lithium seed layer onto the surface of the LiPON to form the anode.

Figure 13:
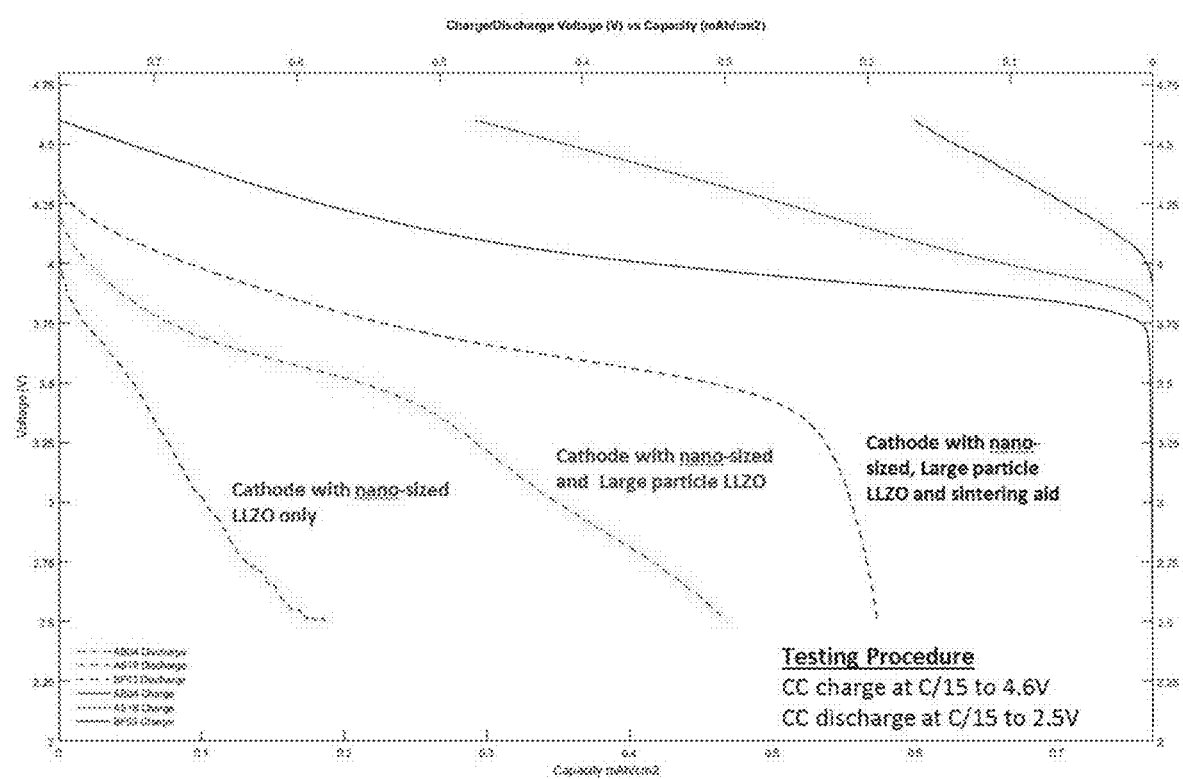
FIG. 13 is a graph of charge/discharge cycle data for cells with cathodes using NCM with solid electrolyte (nano-sized and/or large particle size) with and without $Li_3BO_3$—$Li_2CO_3$ sintering aid.

FIG. 13 shows the charge and discharge capacity of the cells from examples, 4a, 4b, and 4c at room temperature cycling at a c-rate of C/15. As seen, cathodes with only nano-sized LLZO (example 4a) showed a discharge capacity of 0.20 $mAh/cm^2$, whereas cathodes with nano-sized and large particle sized LLZO showed significant improvement in the average voltage and discharge capacity, approximately a 140% increase (0.48 mAh/cm$^2$). Further enhancement of the average voltage and discharge capacity (25% increase to 0.60 mAh/cm$^2$) was obtained when sintering aid $Li_3BO_3$—$Li_2CO_3$ was added to the nano-sized and large particle LLZO.

Example 5: Preparation of Separator by Melt Quenching

A mixture was prepared by high energy milling 4 g (61%) NCM active cathode material powder, (36 wt %) 2.4 g nano-sized (<0.3 μm average particle size) LLZO electrolyte, and 0.2 g (3 wt %) polymer binder (PVB) with 1.5 ml of ethanol and 1.5 ml of xylene solvents. The mixture was then cast onto a non-stick, polyester sheet material and allowed to dry. Multiple castings were made and were subsequently calendared together to form a single multilayered sheet, with each layer being approximately 50 μm thick. Discs were punched from the sheet and then heated at 400° C. for 3 hours to remove the binder and then at 850° C. for 30 mins to obtain a porous, sintered, cathode disc.

After sintering the cathode disc, 0.1 g of $Li_3BO_3:Li_2CO_3:Li_2SO_4$ dry powder was suspended in isopropyl alcohol and subsequently placed on top of the porous cathode disc. Next, the cathode was placed in an oven at 620° C. to melt the $Li_3BO_3:Li_2CO_3:Li_2SO_4$, allowing it to migrate into the cathode under capillary force until the voids in the cathode were filled, leaving excess molten material on the surface of the cathode disc. The filled cathode disc with excess molten $Li_3BO_3:Li_2CO_3:Li_2SO_4$ on its surface was then calendered using a roller at room temperature, thus quenching the electrolyte on the surface and inside of the cathode, forming a glass separator on the cathode surface that also extended throughout the thickness of the cathode.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A solid state battery comprising a cathode, a separator and an anode, wherein at least one of the cathode and the anode has a surface adjacent to the separator and comprises a mixture of an electrochemically active material and a first inorganic solid particulate electrolyte having high ionic conductivity, wherein the first inorganic solid particulate electrolyte has a particle diameter of about 100 nm to about 1 mm, and wherein the first inorganic solid particulate electrolyte contained in the cathode and/or the anode is embedded in the surface thereof and extends a substantial distance into the cathode and/or the anode, is in physical contact with the separator, and provides electrolyte high ionic conductivity continuity from the separator into the cathode and/or the anode.

2. The solid state battery according to claim 1, wherein at least one of the cathode and the anode further comprises a first low melting point solid inorganic electrolyte, wherein the first low melting point electrolyte extends through pores within the cathode and/or the anode.

3. The solid state battery according to claim 2, wherein the first low melting point solid inorganic electrolyte comprises a doped metal oxide containing at least one of boron and carbon.

4. The solid state battery according to claim 3, wherein the doped metal oxide is a doped lithium oxide.

5. The solid state battery according to claim 3, wherein the doped metal oxide is doped with about 0.1 to about 20 atomic percent of a dopant element or compound.

6. The solid state battery according to claim 3, wherein the doped metal oxide is a lithium metal oxide doped with at least one element or compound selected from the group consisting of silicon, fluorine, germanium, sulfur, lithium fluoride, silicon dioxide, lithium metaborate, and lithium orthoborate.

7. The solid state battery according to claim 2, wherein the first low melting point solid inorganic electrolyte is at least one material selected from the group consisting of lithium metaborate doped lithium carbonate, silicon doped lithium tetraborate, lithium fluoride doped lithium metaborate, silicon doped lithium tetraborate, lithium orthoborate doped lithium carbonate ($Li_3BO_3$—$Li_2CO_3$), lithium carbonate doped lithium orthoborate ($Li_2CO_3$—$Li_3BO_3$), silicon dioxide doped $Li_3BO_3$—$Li_2CO_3$, lithium fluoride doped $Li_3BO_3$—$Li_2CO_3$, fluorine doped $Li_3BO_3$—$Li_2CO_3$, sulfur doped $Li_3BO_3$—$Li_2CO_3$, silicon doped $Li_3BO_3$—$Li_2CO_3$, fluorine and silicon doped $Li_3BO_3$—$Li_2CO_3$, germanium doped $Li_3BO_3$—$Li_2CO_3$, silicon dioxide doped $Li_2CO_3$—$Li_3BO_3$, lithium fluoride doped $Li_2CO_3$—$Li_3BO_3$, fluorine doped $Li_2CO_3$—$Li_3BO_3$, sulfur doped $Li_2CO_3$—$Li_3BO_3$, silicon doped $Li_2CO_3$—$Li_3BO_3$, fluorine and silicon doped $Li_2CO_3$—$Li_3BO_3$, and germanium doped $Li_2CO_3$—$Li_3BO_3$.

8. The solid state battery according to claim 2, wherein the first low melting point solid inorganic electrolyte has general formula $N_vN'_wN''_xN'''_yN''''_z$ wherein
   N represents at least one element selected from Group IA of the Periodic Table,
   N' represents at least one element selected from Group IVA of the Periodic Table,
   N" represents at least one element from Group IIIA of the Periodic Table,
   N''' represents at least one element from Group VIA of the Periodic Table, and
   N'''' represents at least one dopant selected from Groups IA-VIIA of the Periodic Table and transitional metals, and
wherein v, w, x, y, and z are each zero or a positive number, including various combinations of integers and fractions or decimals, provided that the electrolyte contains oxygen and at least one of carbon and boron.

9. The solid state battery according to claim 8, wherein N represents lithium, N' represents carbon, N" represents boron, N''' represents oxygen and N'''' represents silicon.

10. The solid state battery according to claim 1, wherein at least one of the cathode and the anode further comprises an electronically conductive material.

11. The solid state battery according to claim 1, wherein the separator comprises a second inorganic solid particulate electrolyte having high ionic conductivity, wherein the second inorganic solid particulate electrolyte has a particle diameter of about 100 nm to about 100 microns.

12. The solid state battery according to claim 11, wherein the separator further comprises a second low melting point solid inorganic electrolyte.

13. The solid state battery according to claim 12, wherein the second low melting point solid inorganic electrolyte comprises a doped metal oxide containing at least one of boron and carbon.

14. The solid state battery according to claim 13, wherein the second low melting point solid inorganic electrolyte is at least one material selected from the group consisting of lithium metaborate doped lithium carbonate, silicon doped lithium tetraborate, lithium fluoride doped lithium metaborate, silicon doped lithium tetraborate, lithium orthoborate doped lithium carbonate ($Li_3BO_3$—$Li_2CO_3$), lithium carbonate doped lithium orthoborate ($Li_2CO_3$—$Li_3BO_3$), silicon dioxide doped $Li_3BO_3$—$Li_2CO_3$, lithium fluoride doped $Li_3BO_3$—$Li_2CO_3$, fluorine doped $Li_3BO_3$—$Li_2CO_3$, sulfur doped $Li_3BO_3$—$Li_2CO_3$, silicon doped $Li_3BO_3$—$Li_2CO_3$, fluorine and silicon doped $Li_3BO_3$—$Li_2CO_3$, germanium doped $Li_3BO_3$—$Li_2CO_3$, silicon dioxide doped $Li_2CO_3$—$Li_3BO_3$, lithium fluoride doped $Li_2CO_3$—$Li_3BO_3$, fluorine doped $Li_2CO_3$—$Li_3BO_3$, sulfur doped $Li_2CO_3$—$Li_3BO_3$, silicon doped $Li_2CO_3$—$Li_3BO_3$, fluorine and silicon doped $Li_2CO_3$—$Li_3BO_3$, and germanium doped $Li_2CO_3$—$Li_3BO_3$.

15. The solid state battery according to claim 12, wherein the second low melting point solid inorganic electrolyte has general formula $N_v N'_w N''_x N'''_y N''''_z$ wherein N represents at least one element selected from Group IA of the Periodic Table, N' represents at least one element selected from Group IVA of the Periodic Table, N" represents at least one element from Group IIIA of the Periodic Table, N''' represents at least one element from Group VIA of the Periodic Table, and N"" represents at least one dopant selected from Groups IA VIIA of the Periodic Table and transitional metals, and wherein v, w, x, y, and z are each zero or a positive number, including various combinations of integers and fractions or decimals.

16. The solid state battery according to claim 1, wherein the separator is amorphous or glass-crystalline.

17. The solid state battery according to claim 1, wherein at least one of the cathode and the anode is amorphous or glass-crystalline.

18. The solid state battery according to claim 1, wherein the separator has a first side and a second side, the cathode is disposed on the first side of the separator and the anode is disposed on the second side of the separator, and wherein the particulate electrolyte particles contained in the cathode and/or the anode extend into the separator.

19. The solid state battery according to claim 1, wherein the cathode contains the first inorganic solid particulate electrolyte, and wherein a diameter of the particulate electrolyte particles represents about 60 to 80% of a thickness of the cathode.

* * * * *